(12) United States Patent
Murdoch et al.

(10) Patent No.: US 11,420,850 B2
(45) Date of Patent: Aug. 23, 2022

(54) RETRACTING RAIL CLAMP

(71) Applicant: PORTAL CRANE PARTS LTD., Port Coquitlam (CA)

(72) Inventors: Allan Roy Murdoch, Port Coquitlam (CA); Igor Berliant, Port Coquitlam (CA)

(73) Assignee: PORTAL CRANE PARTS LTD., Port Coquitlam (CA)

( * ) Notice: Subject to any disclaimer, the term of this patent is extended or adjusted under 35 U.S.C. 154(b) by 0 days.

(21) Appl. No.: 16/984,009

(22) Filed: Aug. 3, 2020

(65) Prior Publication Data
US 2021/0188598 A1 Jun. 24, 2021

Related U.S. Application Data

(63) Continuation of application No. 15/550,744, filed as application No. PCT/CA2016/000035 on Feb. 11, 2016, now Pat. No. 10,730,722.

(60) Provisional application No. 62/115,020, filed on Feb. 11, 2015.

(51) Int. Cl.
| | |
|---|---|
| *B66C 9/18* | (2006.01) |
| *B61H 7/12* | (2006.01) |
| *F16D 63/00* | (2006.01) |
| *B60T 1/14* | (2006.01) |
| *F16M 13/02* | (2006.01) |

(52) U.S. Cl.
CPC ............ *B66C 9/18* (2013.01); *B60T 1/14* (2013.01); *B61H 7/12* (2013.01); *F16D 63/008* (2013.01); *F16M 13/022* (2013.01)

(58) Field of Classification Search
CPC ... B66C 9/18; B60T 11/14; B61H 7/12; F16D 63/008; F16M 13/022
See application file for complete search history.

(56) References Cited

U.S. PATENT DOCUMENTS

| | | | |
|---|---|---|---|
| 2,856,030 | A | 10/1958 | Snow |
| 2,877,974 | A | 3/1959 | Estes |
| 2,961,269 | A | 11/1960 | Renfroe |
| 4,308,937 | A | 1/1982 | Johnson et al. |
| 4,744,302 | A | 5/1988 | Theurer et al. |
| 7,975,811 | B2 | 7/2011 | Berliant |
| 8,646,582 | B2 | 2/2014 | Bourhill et al. |
| 9,663,123 | B2 | 5/2017 | Bourhill et al. |
| 2009/0183956 | A1* | 7/2009 | Berliant ............... F16D 63/008 188/43 |

(Continued)

*Primary Examiner* — Anita M King
(74) *Attorney, Agent, or Firm* — Knobbe, Martens, Olson & Bear, LLP

(57) ABSTRACT

A retracting rail clamp for braking or anchoring a rail-mounted machine such as a crane by clamping opposite sides of a longitudinal rail member, the retracting rail clamp comprising: a load transfer frame rigidly secured to the crane, such as by bolting; and a clamp mechanism suspended within the load transfer frame by at least one lateral pair of pivotally mounted lift levers, and operable through a first and second stage of motion between a raised, brake release position, in which the entirety of the rail clamp is disposed substantially vertically clear of the rail, and a lowered, brake set position wherein at least one opposed facing pair of main levers of the clamp mechanism engage the side surfaces of the rail.

10 Claims, 19 Drawing Sheets

(56) References Cited

U.S. PATENT DOCUMENTS

| | | | |
|---|---|---|---|
| 2012/0241262 A1* | 9/2012 | Bourhill | B61K 7/08 188/43 |
| 2014/0158475 A1* | 6/2014 | Bourhill | B61K 7/08 188/43 |
| 2015/0175177 A1 | 6/2015 | Bourhill | |

* cited by examiner

RETRACTING RAIL CLAMP

CROSS-REFERENCE TO RELATED APPLICATIONS

This application is a continuation of U.S. application Ser. No. 15/550,744, filed on Aug. 11, 2017, which is the U.S. National Phase under 35. U.S.C. § 371 of International Application PCT/CA2016/000035, filed Feb. 11, 2016, which claims the benefit of U.S. Provisional Application No. 62/115,020, filed Feb. 11, 2015. The disclosures of the above-described applications are hereby incorporated by reference in their entirety.

TECHNICAL FIELD

In embodiments of the presently disclosed subject matter, there is provided a retracting rail clamp for braking or anchoring a rail-mounted machine such as a crane by clamping opposite sides of a longitudinal rail member.

BACKGROUND

Rail clamps, also sometimes referred to as storm brakes, are generally known in the art. By way of example, U.S. Pat. No. 3,972,392 to Johnson, issued 3 Aug. 1976, discloses a clamping apparatus adapted to grip the sides of rails in a fail-safe mode of operation, thereby to secure an unpowered or unattended crane to its rails and resist external forces tending to move the crane along the rails. Johnson teaches that a fail-safe clamping apparatus adapted to clamp the sides of crane rails should satisfy several requirements. First, it should be independently powered by fail-safe means such that it is actuated when the crane is unpowered or unattended; second, the clamping assembly should permit sufficient lateral movement of the clamp with respect to the rail to accommodate the movement of the crane wheels on the rail as limited by the tread width between the wheel flanges; third, lateral movement of the clamp assembly should not significantly alter the angle at which the clamping surfaces approach the sides of the crane rails; fourth, where the clamping surfaces comprise metal serrated shoes of hardness substantially greater than that of the rail, means should be provided to prevent the shoes from dragging on the rails when the crane moves along its rails; fifth, the clamping assembly should be of narrow cross section such that the opening in a travelled surface in which the rails are embedded, as in the case of a dock facility, does not exceed approximately three times the width of the top of the rail; and finally, means should be provided whereby remote sensing means are provided to indicate to the crane operator that the clamp is fully released prior to movement of the crane on its rails. Johnson provides a fail-safe clamping apparatus wherein its clamping surfaces are externally mounted to facilitate periodic examination without disassembling the clamping assembly.

U.S. Pat. No. 7,975,811 to Berliant, issued 12 Jul. 2011, discloses a constant force rail clamp having a frame and a pair of levers. Each of the levers has a brake pad at a first end thereof, a cam follower at second end thereof, and is mounted to the frame by a pivot disposed between said first and second ends. A cam is disposed between the levers and a spring biases the cam in a first direction. A clamp release actuator is operable to displace the cam in a second direction, which is opposite to the first direction. A pair of variably sloped cam surfaces are disposed on opposite sides of the cam. Each of the variably sloped cam surfaces is in contact with the cam follower of a corresponding one of the levers, and each of the variably sloped cam surfaces has a slope which varies to counteract variations in a spring force of the spring as the cam is displaced, thereby maintaining a constant clamping force.

In U.S. Pat. No. 8,646,582 to Bourhill et al., issued 11 Feb. 2014, the rail clamp includes a carriage having an actuator frame mounted to its base so as to extend upwardly from the base. Springs are mounted in the actuator frame at the upper end of the carriage. An actuator is mounted between the base and the springs, and operates on the suspension frame so as to elevate the carriage. A wheel is mounted on a wheel support, and the wheel engages the rail. At least one suspension frame is pivotally mounted to the carriage and at an opposite end, to the wheel support. A pair of clamping levers is pivotally mounted to the base of the carriage, and the levers are pivotable so as to clamp their lower-most ends together when their upper ends are moved apart. Brake shoes mount on the lower-most ends of the levers.

SUMMARY

The presently disclosed retracting rail clamp generally comprises: a load transfer frame rigidly secured to the crane, such as by bolting; and a clamp mechanism suspended within the load transfer frame by at least one lateral pair of pivotally mounted lift levers, and operable through a first and second stage of motion between a raised, brake release position, in which the entirety of the rail clamp is disposed substantially vertically clear of the rail, and a lowered, brake set position wherein at least one opposed facing pair of main levers of the clamp mechanism engage the side surfaces of the rail.

The primary forces to be resisted by the rail clamp (e.g. wind load) whilst deployed in the lowered, brake set position act in a direction that is substantially parallel to the longitudinal orientation of the rail. The load transfer frame is accordingly configured internally so as to cradle and provide longitudinal support to the clamp mechanism with a minimal amount of free play in the longitudinal orientation when the mechanism is deployed in the lowered brake set position, but also to permit substantially free vertical and lateral translational motion of the clamp mechanism within the load transfer frame between the raised and lowered positions. Unless the specific context requires otherwise, all references in this specification to a "longitudinal" orientation refer to a direction that is substantially parallel to the longitudinal orientation of the rail; "lateral" orientation refers to a direction that is substantially perpendicular to the longitudinal orientation of the rail.

In some embodiments, the load transfer frame additionally comprises longitudinally extending internal load transfer beams or braces to further enhance longitudinal location of the deployed clamp mechanism within the load transfer frame. The load transfer frame may also be configured with or comprise chamfered laterally extending internal beams or braces that cooperate with corresponding chamfers or cam rollers of the clamp mechanism so as to laterally center the clamp mechanism within the load transfer frame when it is returned to the raised, brake release position.

The clamp mechanism comprises a clamp frame, which includes at least two spaced-apart guide posts connecting an upper frame plate or assembly with a lower main lever connector plate or assembly. Each of the at least one pair of lift levers are pivotally mounted on brackets provided at opposing lateral ends of the upper frame plate. The lift levers further comprise anti-friction cam rollers at their free ends to enable the clamp mechanism to "float" with minimum resistance generally horizontally in a lateral orientation (i.e. substantially perpendicular to the longitudinal orientation of the rail) within at least one corresponding lateral pair of opposed facing transverse C-channels, or upon at least one pair of preferably round pegs provided on the load transfer frame.

Each of the opposed facing main levers is pivotally mounted to the main lever connector plate by a pivot disposed between a first, upper end and a second, lower end thereof, such that the lower ends of each opposed facing pair of main levers clamp together when their upper ends are moved laterally apart. A brake shoe may be provided on the inner face of the lower end of each opposed main lever, and either a bearing (e.g. cam roller) or a bearing surface (e.g. cam follower) is provided on the inner face of the upper end of each opposed main lever. One or more auxiliary return springs may also be provided (either extending directly between the upper ends of each of the opposed facing main levers, or coaxially with the pivot of each main lever) in order to bias the upper ends of each of the opposed facing main levers together. The main lever connector assembly further comprises, or has rigidly affixed to a lower surface thereof, at least one transverse lateral rail guide. The rail guide has a bilateral inwardly angled "double cam" profile dimensioned to produce the necessary side loads to cause the clamp mechanism to move laterally within the load transfer frame, as may be necessary in order to accommodate for rail misalignments, and to center the clamp mechanism over the rail as the mechanism is lowered vertically onto the rail and into the lowered, brake set position. The rail guide may preferably be constructed of a hardened steel in order to provide a relatively low coefficient of friction vis-à-vis the railhead.

A spring plate is slidable along the guide posts of the clamp frame, and is urged in a first, clamping direction by at least one main power spring disposed between the lower main lever connector assembly and the spring plate. A hydraulically actuated piston is operably connected to the spring plate, and may be driven under control of an operator by hydraulic pressure in a second, release direction opposite to the clamping direction (i.e. against the biasing force of the power spring) from a hydraulic cylinder operably connected to the upper frame assembly. Suitable low-friction bushings may preferably be provided within bores of the spring plate to slidingly accommodate the guide posts.

As described in additional detail below, the spring plate further comprises, or has rigidly affixed to a lower surface thereof, a power wedge cam assembly or a paired cam roller assembly that cooperates with and acts upon either the bearing (in embodiments where a power wedge cam is employed) or the bearing surface (in embodiments where a paired cam roller assembly is employed) of each of the opposed facing pair of main levers as the spring plate moves relative to the clamp frame in either the first, clamping direction or in the second, release direction. At least one pair of slotted lift links are pivotally mounted in brackets at opposing lateral ends of the spring plate, each of which links extends generally vertically upwards to slidingly engage a pin provided at a selected distance along the elongate body of each corresponding one of the at least one lateral pair of pivotally mounted lift levers (from which the clamp mechanism is suspended within the load transfer frame).

During the first stage of motion of the rail clamp, relative motion between the spring plate and the clamp frame is primarily or entirely converted into a generally vertical translation of the clamp mechanism within the load transfer frame. As hydraulic pressure within the hydraulic cylinder is reduced to a value below the spring rate of the main power springs, the power springs cause the piston to retreat into the cylinder and the spring plate to slide along the guide posts in the clamping direction (i.e. away from the lower main lever connector plate and toward the upper frame plate). Since the lift levers are mounted on the upper frame plate and their corresponding lift links are mounted on the spring plate, this relative motion between the spring plate and upper frame plate (i.e. the clamp frame) causes a corresponding generally vertical upward translational motion of the lift links to occur vis-à-vis the lift levers. This relative upwards extension of the lift links in turn allows the lift levers to pivot upwards, and the clamp mechanism to lower towards and onto the rail under the force of gravity. As noted above and further detailed below, if the clamp mechanism is not laterally centered over the rail upon initial contact therewith, the weight of the clamp mechanism acting on the transverse rail guide having a bilateral inwardly angled "double cam" profile causes, in conjunction with the anti-tilt apparatus described below, the clamp mechanism to shift laterally within the load transfer frame as may be required in order to permit a centered seating of the clamp mechanism on the rail.

The distance at which the pin is located along the elongate length of each of the pair of lift levers (measured from the pivotally mounted end of the lift lever towards the free end thereof) determines a lever ratio for the lift levers. In some preferred embodiments, a roughly 3:1 ratio of lift lever movement is specified, such that the clamp mechanism moves roughly 75 mm vertically for each 25 mm of power spring extension during the first stage of motion of the rail clamp. Other lever ratios are of course also possible, and may be selected with reference to the stroke and rate of the power springs, and to the desired vertical clearance of the rail clamp (in the brake release position) for a given application. In general, to achieve suitable clamp mechanism lift and lowering whilst minimizing spring force loss in the power springs, a lift lever ratio of at least 2:1 is desirable.

Once the clamp mechanism has become seated on the rail and no further downward vertical translation of the clamp frame is possible, the main clamp levers are deployed against the side surfaces of the rail during the second stage of motion of the rail clamp until the lowered, brake set position of the rail clamp has been reached. Although further vertical translational motion of the clamp frame is prevented by contact with the rail, relative motion (in either the clamping or release direction) between the spring plate and the clamp frame is permitted to continue during this second stage of clamp mechanism motion by virtue of the freedom of the lift lever pins to travel within the elongate slots of the slotted lift links.

In embodiments where the spring plate comprises a power wedge cam and the main levers comprise corresponding cam roller bearings, the relative motion of the spring plate and clamp frame (during both first and second stages of motion) causes the bearings of the opposed main levers to correspondingly travel along and follow the lateral horizontal profile at each point along the vertical elongate length of the power wedge cam. As the lateral profile of the power wedge cam widens, the upper ends of the main levers are correspondingly driven laterally apart. One or more auxiliary return springs may be provided to bias the upper ends of the opposed facing main levers together in order to maintain contact between the main levers and the power wedge cam when the lateral profile of the power wedge cam narrows.

However, various alternate biasing means for maintaining the lever bearings in rolling contact with the power wedge cam are also possible. For example, each of the main levers may include an auxiliary bracket configured for sliding engagement within a vertically extending channel provided on the power wedge cam.

The lateral horizontal profile of the power wedge cam may be varied in width and/or slope along its elongate vertical length so as to cause a different magnitude of main lever displacement and/or force at different points during the operation of the rail clamp between its raised, brake release position and its lowered, brake set position. For example, in some preferred embodiments, the power wedge cam includes a first straight portion of constant lateral width, and a second generally frustoconical portion in which the lateral width of the power wedge cam increases at a constant or increasing rate. In these embodiments, the first straight portion corresponds to the first stage of rail clamp motion, such that no main lever displacement is caused while the rail clamp is being lowered (or raised up) over the rail, and the second frustoconical portion corresponds to the second stage of motion, in which vertical translation of the rail clamp has ceased, and in which the main levers are driven into engagement with the side surfaces of the rail. A variety of suitable constant and/or increasing slopes of the second generally frustoconical portion are possible, and may be calculated with reference to the stroke and rate of the power springs in a given application.

Alternate configurations of the lateral horizontal profile of the power wedge cam are, of course, also possible. For example, in embodiments where the main levers are configured for a relatively long stroke, and/or where the width of the rail is small compared to the lateral distance between the main lever pivots on the lower main lever connector plate, the first straight portion of the power wedge cam may be abbreviated or eliminated entirely because early commencement of main lever clamping will not lead to interference between the lower ends of the main levers and the rail.

The lateral profile of the power wedge is typically symmetrical about its vertical centerline, such that both main levers of each pair are driven laterally apart (or allowed to draw together) by the same distance as the power wedge cam translates vertically relative to the main lever bearings. However, in alternate embodiments, such as where rail configuration or other environmental considerations make it desirable for main lever action to be asymmetrical (i.e. with one of the main levers of a pair travelling a greater distance than the other to reach and clamp onto a rail), the lateral profile of the power wedge cam may be asymmetrical about its vertical centerline.

Similar considerations and variations as outlined above also apply in relation to embodiments in which the spring plate comprises a paired cam roller assembly that cooperates with and acts upon a bearing surface provided on each of the opposed facing pair of main levers. In these paired cam roller embodiments, the paired cam rollers rotate about a pair of longitudinally oriented axes, and are held in horizontal side-by-side relation and in contact with one another (opposite their respective point of contact with the bearing surface of a corresponding main lever) by at least one bracket that is integral with or rigidly secured to the lower surface of the spring plate. The paired cam rollers accordingly rotate in opposite directions during the relative motion of the spring plate and clamp frame, and by virtue of being in contact with one another equalize or cancel the lateral compressive forces that may be created by the action of the paired cam rollers against the bearing surfaces of the main levers. This results in significant improvements in lowering friction losses, thereby improving force efficiency.

The bearing surfaces of the opposed upper ends of the main levers (and/or the main levers themselves) in these paired cam roller embodiments are configured so as to angle inwards towards one another, such that the lateral horizontal distance between the bearing surfaces decreases as the distance from the respective pivot axes about which the main levers pivot increases. Accordingly, as the paired cam rollers move vertically upwards relative to the main levers (and as the main levers correspondingly swing laterally outward), a lower attack angle is created, which in turn produces a greater mechanical advantage. In addition, the vertical extension of the paired cam rollers away from the pivot axes of the main levers creates a longer lever ratio, again increasing mechanical advantage. The total effect of this combined total mechanical advantage may accordingly be engineered to compensate for loss of spring force in the main power springs as they extend from a compressed to extended state. As with the power wedge cam embodiments described above, biasing means such as auxiliary return springs may be employed to maintain the bearing surfaces of the main levers in constant contact with the paired cam roller assembly throughout the operational range of the rail clamp.

The lateral profile of the bearing surfaces of the opposed main levers may also include variations analogous to those of the power wedge cam embodiments described above, so as to cause desired variations in the magnitude of main lever displacement and/or force at different points along the operation of the rail clamp between its raised and lowered positions.

To prevent the clamp mechanism from tipping over laterally when contact is made between only one of the bilateral inwardly angled cam surfaces of the rail guide (as may occur when the mechanism is lowered onto a non-centered rail), the clamp mechanism further comprises at least one form of anti-tilt apparatus that constrains lateral movement of the mechanism to substantially vertical and/or substantially lateral horizontal translational motion. In some embodiments, this anti-tilt apparatus may comprise at least one auxiliary double parallelogram linkage between the clamp mechanism and the load transfer frame. In other embodiments, the resolution of any tilting forces acting on the clamp mechanism into substantially vertical and substantially lateral horizontal components may be achieved by incorporating an intermediate link assembly, as described below, between the paired lift levers from which the clamp mechanism is suspended within the load transfer frame.

A double parallelogram linkage is known in the art, and generally comprises a central link body and two pairs of pivotally mounted equal-length arms. The individual arms of the first pair are pivotally mounted to the link body in spaced apart relationship in a first (e.g. horizontal) orientation, and the arms of the second pair are pivotally mounted to the link body in spaced apart relationship in a second (e.g. vertical) orientation that is perpendicular to the first orientation. The free ends of one pair of equal-length arms are pivotally mounted in spaced apart relationship (at the same distance apart as the arms of the pair are connected to the link body) to the clamp mechanism, and the free ends of the other pair of equal-length arms are pivotally mounted in spaced apart relationship (again at the same distance apart as the arms of the pair are connected to the link body) to the load transfer frame. Since the double parallelogram linkage effectively constrains motion of the clamp mechanism within the load transfer frame to only substantially vertical and substantially lateral horizontal orientations, the anti-friction cam rollers of the lift levers in embodiments that include a double parallelogram linkage may be supported by and "float" laterally horizontally upon simple pegs or plates provided on the load transfer frame without further constraint. Round pegs are preferred in order to facilitate the self-clearing of any debris that might accumulate.

In embodiments that employ an intermediate link assembly, the anti-friction cam rollers of the lift levers are constrained within at least one corresponding lateral pair of opposed facing transverse C-channels that permit free lateral horizontal translation of the cam rollers therein, whilst preventing any vertical or longitudinal translational motion thereof. An intermediate link pivotally connects the paired lift levers, and the pivot axis between the intermediate link and one lever of the pair is vertically opposite the corresponding pivot axis between the intermediate link and the second lever of the pair vis-à-vis the main pivot axis of both lift levers on the upper frame plate. For example, if the lift lever/intermediate lever pivot axis of a first lever is disposed vertically above the main pivot axis, then the lift lever/intermediate lever pivot axis of a second lever will be vertically below the main pivot axis. The intermediate link linkage thereby synchronizes movement as between the lift levers, and in combination with the vertical and longitudinal constraint of the free ends of the paired lift levers by the opposed facing transverse C-channels, motion of the clamp mechanism within the load transfer frame is constrained to only substantially vertical and substantially lateral horizontal orientations.

BRIEF DESCRIPTION OF THE DRAWINGS

For a fuller understanding of the nature and advantages of the disclosed subject matter, as well as the preferred modes of use thereof, reference should be made to the following detailed description, read in conjunction with the accompanying drawings. In the drawings, like reference numerals designate like or similar steps or parts.

DETAILED DESCRIPTION OF SPECIFIC EMBODIMENTS

Figure 1:
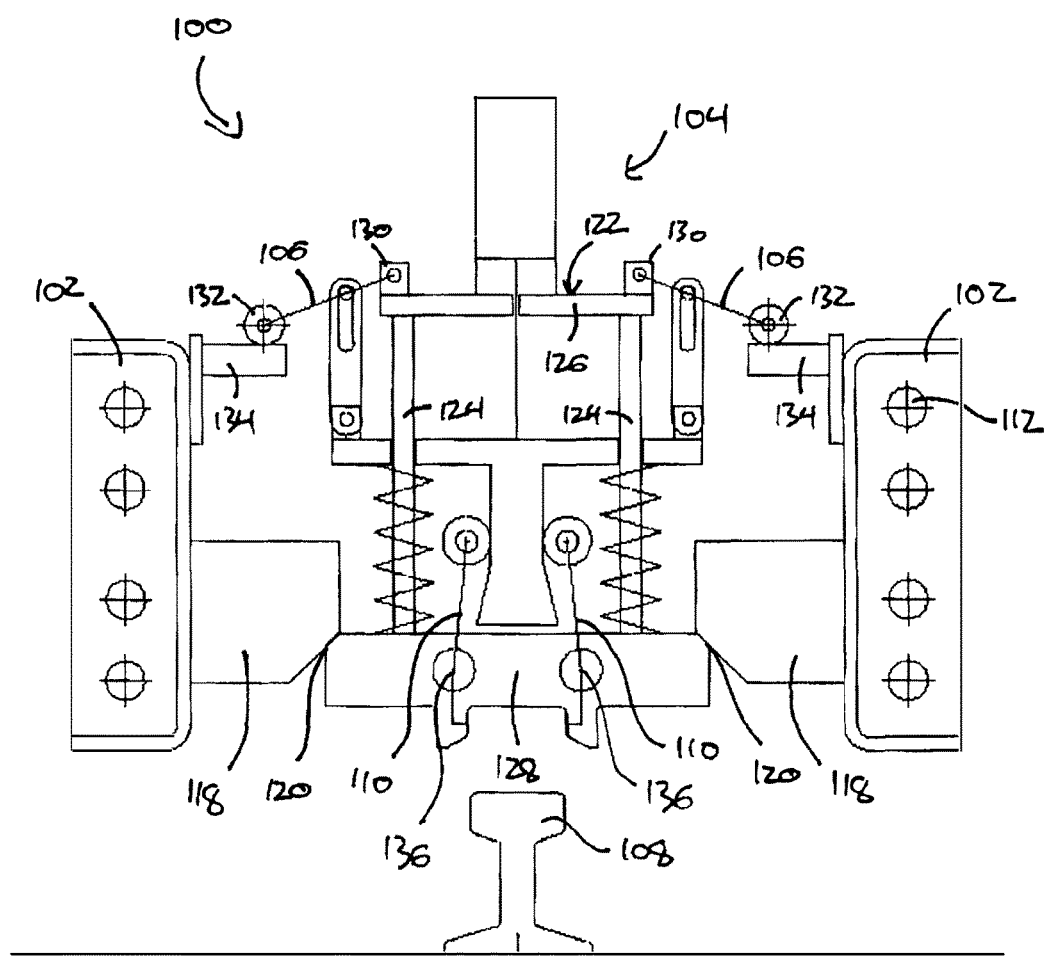
FIG. 1 is a vertical cross-sectional view taken along the lateral midline of a rail clamp according to one embodiment of the presently described subject matter, showing the rail clamp in the fully raised, brake release position with the clamp mechanism laterally centered over a rail.
Figure 2:
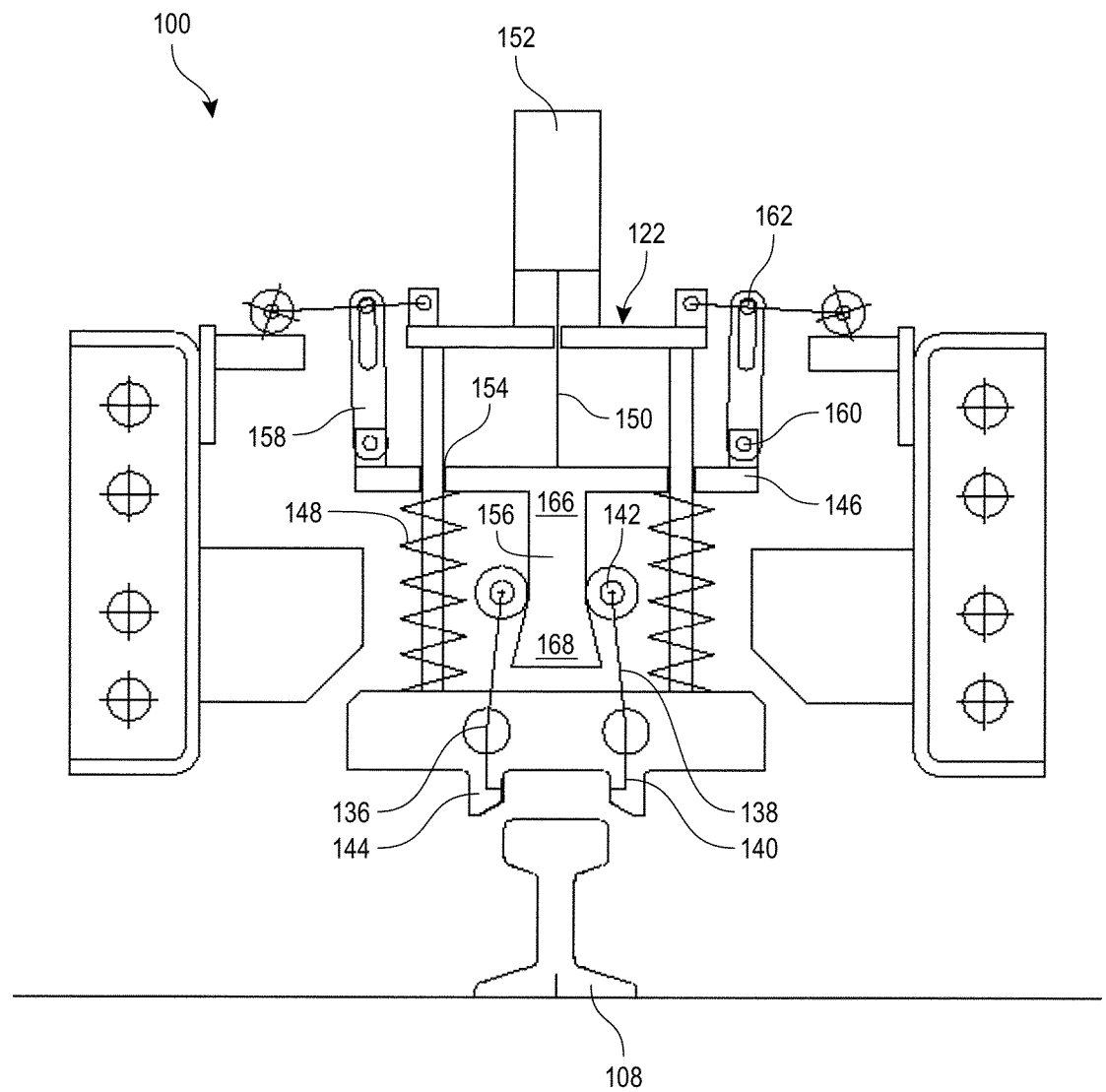
FIG. 2 is a cross-sectional view of the rail clamp of FIG. 1, showing the clamp mechanism in a partially lowered position.
Figure 3:
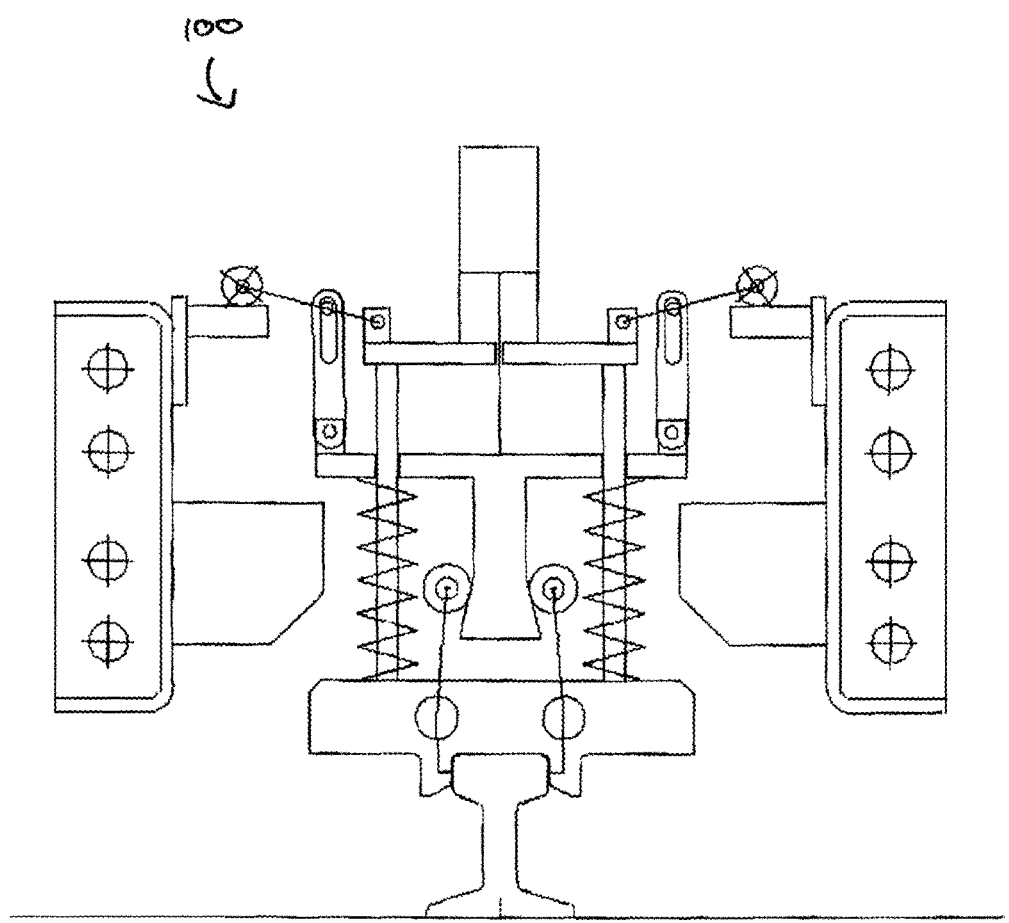
FIG. 3 is a cross-sectional view of the rail clamp of FIG. 1, showing the clamp mechanism further lowered into contact with the rail.
Figure 4:
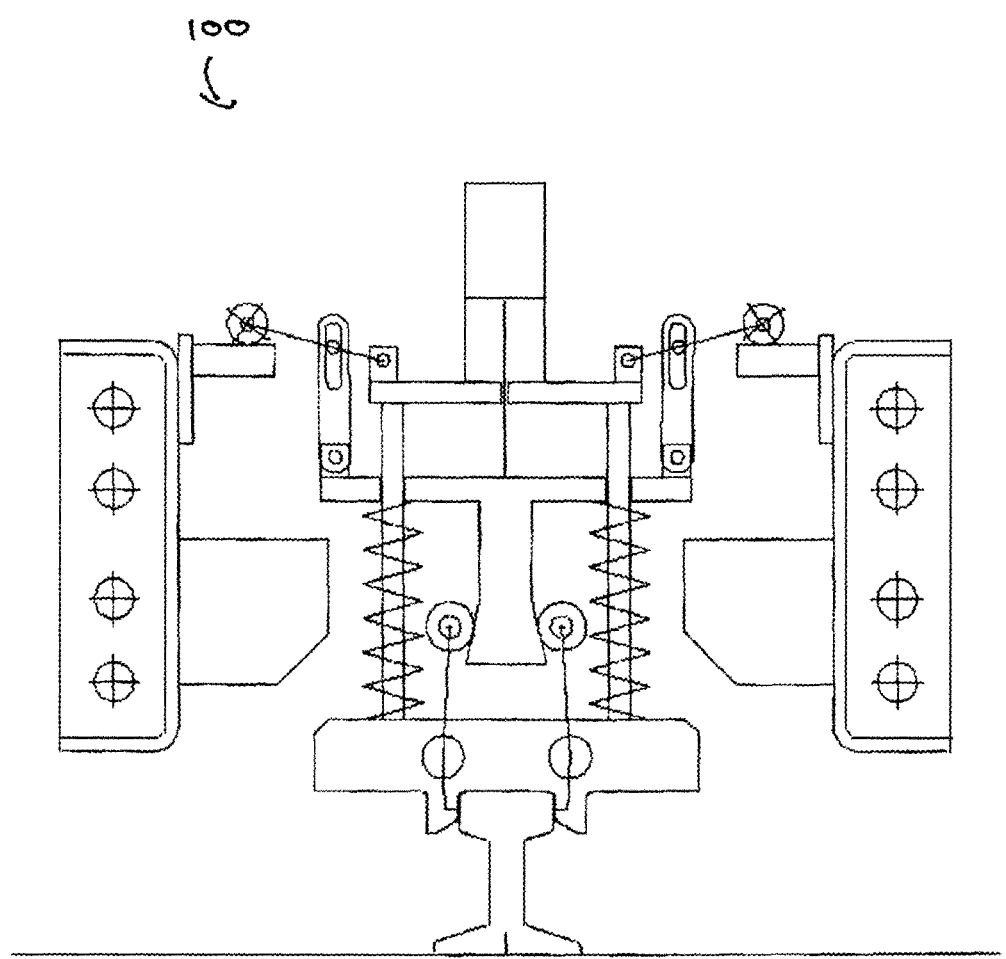
FIG. 4 is a cross-sectional view of the rail clamp of FIG. 1, showing the rail clamp in the fully lowered, brake set position.
Figure 5:
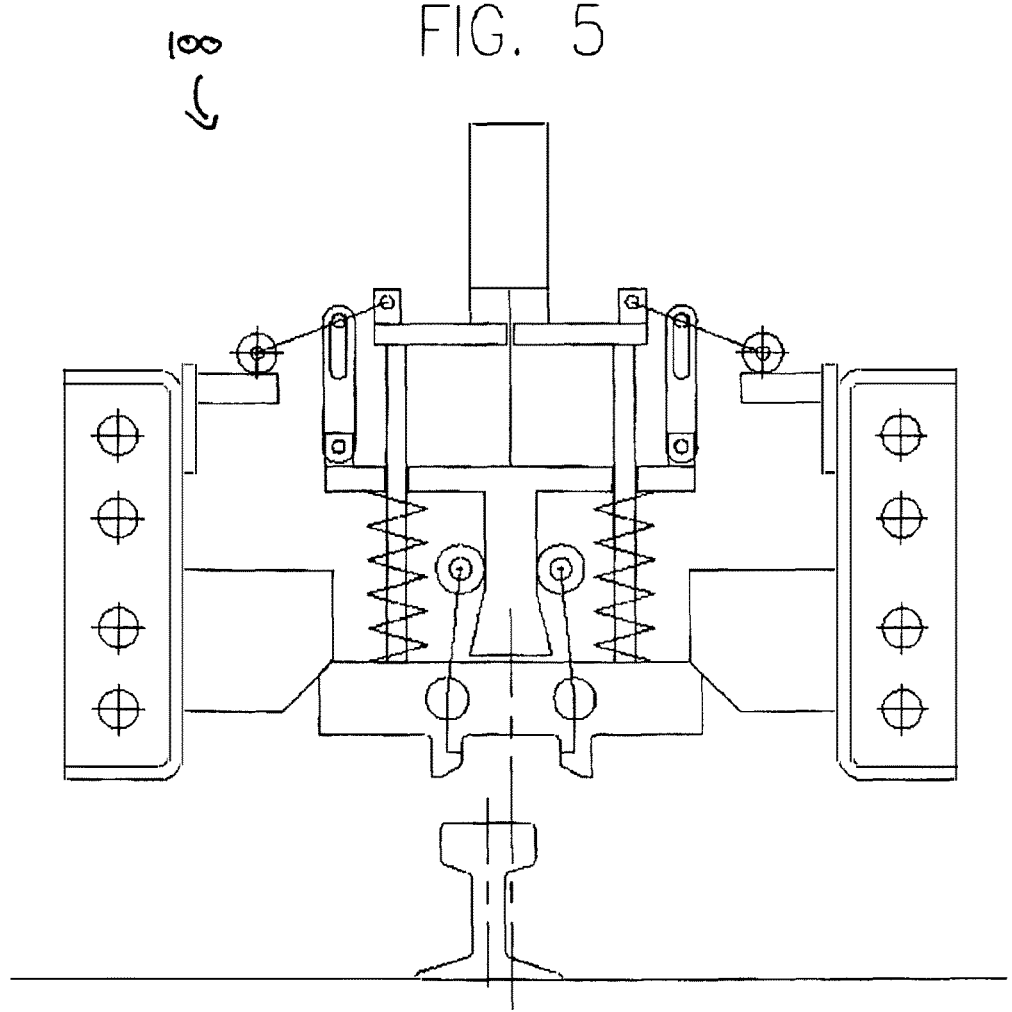
FIG. 5 is a cross-sectional view of the rail clamp of FIG. 1, showing the rail clamp in the fully raised, brake release position with the clamp mechanism laterally displaced with respect to a rail.
Figure 6:
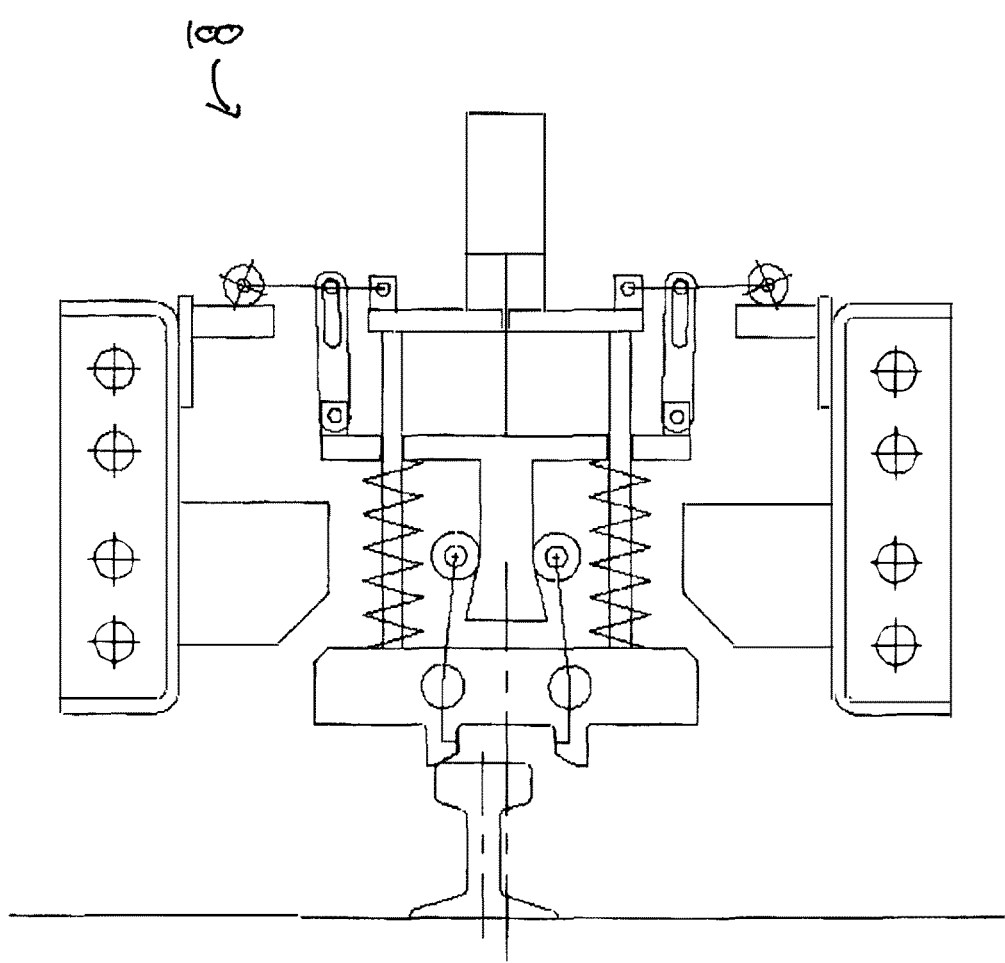
FIG. 6 is a cross-sectional view of the rail clamp of FIG. 5, showing the clamp mechanism in a partially lowered position and in initial contact with the rail.
Figure 7:
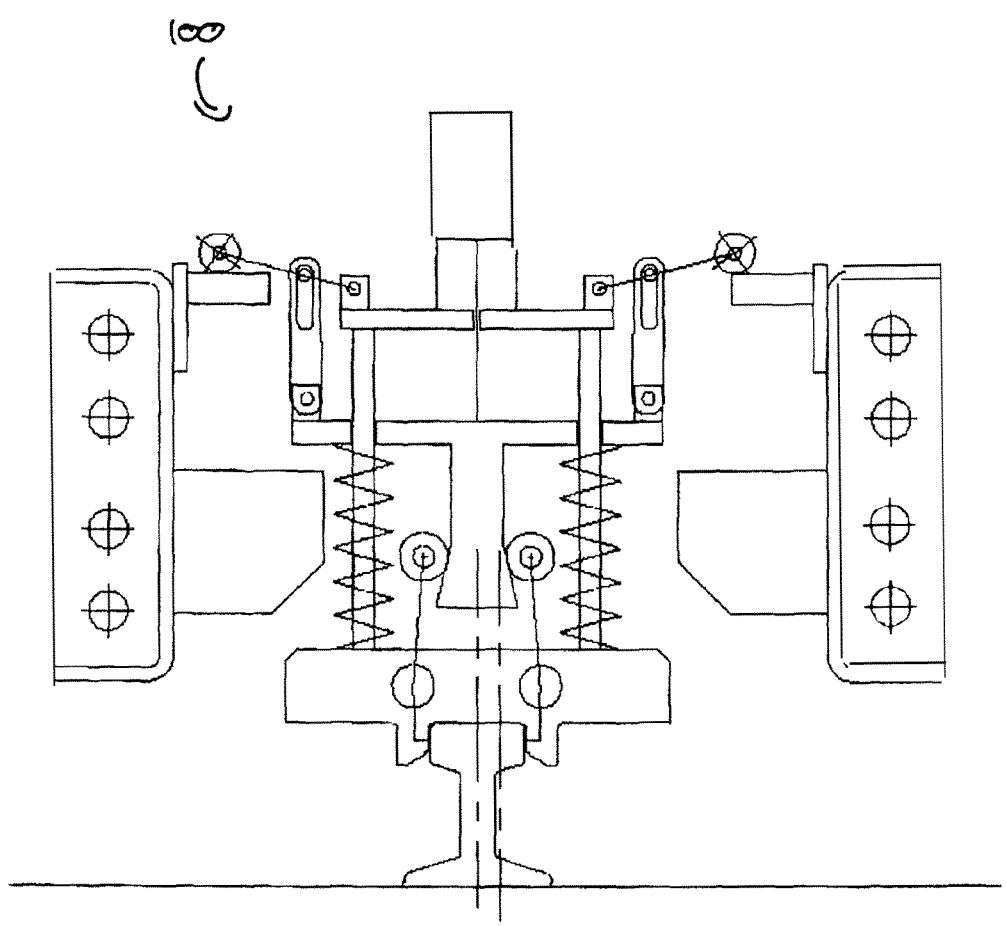
FIG. 7 is a cross-sectional view of the rail clamp of FIG. 5, showing the rail clamp in the fully lowered, brake set position with the clamp mechanism laterally centered over the rail.

The following description of preferred embodiments is merely exemplary in nature and is in no way intended to limit the invention, its application, or uses. The retractable rail clamp of the present invention may take form in a number of different embodiments depending upon the particular requirements of the use, such as the nature, size and weight of the rail-mounted machine to be anchored.

With reference to FIGS. 1-9, there is illustrated one embodiment of a retracting rail clamp 100 for braking or anchoring a rail-mounted machine (not shown) such as a crane. The rail clamp 100 generally comprises a load transfer frame 102 and a clamp mechanism 104 suspended within the load transfer frame 102 by at least one lateral pair of pivotally mounted lift levers 106. As will be described further below, clamp mechanism 104 is operable within load transfer frame 102 through a first and second stage of motion between a raised, brake release position, in which the entirety of the rail clamp 100 is disposed substantially vertically clear of a rail 108, and a lowered, brake set position wherein at least one opposed facing pair of main levers 110 of the clamp mechanism 104 engage the side surfaces of the rail 108. The load transfer frame 102 is adapted for rigid mounting to a rail-mounted machine by bolting through bores 112.

FIGS. 10-17 illustrate an alternate embodiment of a retracting rail clamp 200. As is the case in relation to the embodiment of FIGS. 1-9, rail clamp 200 generally comprises a load transfer frame 202 and a clamp mechanism 204 suspended within the load transfer frame 202 by at least one lateral pair of pivotally mounted lift levers 206, and is operable through a first and second stage of motion between a raised, brake release position, in which the entirety of the rail clamp 200 is disposed substantially vertically clear of a rail 208, and a lowered, brake set position wherein at least one opposed facing pair of main levers 210 of the clamp mechanism 204 engage the side surfaces of the rail 208. The load transfer frame 202 is similarly adapted for rigid mounting to a rail-mounted machine such as by bolting through bores 212.

Figure 16:
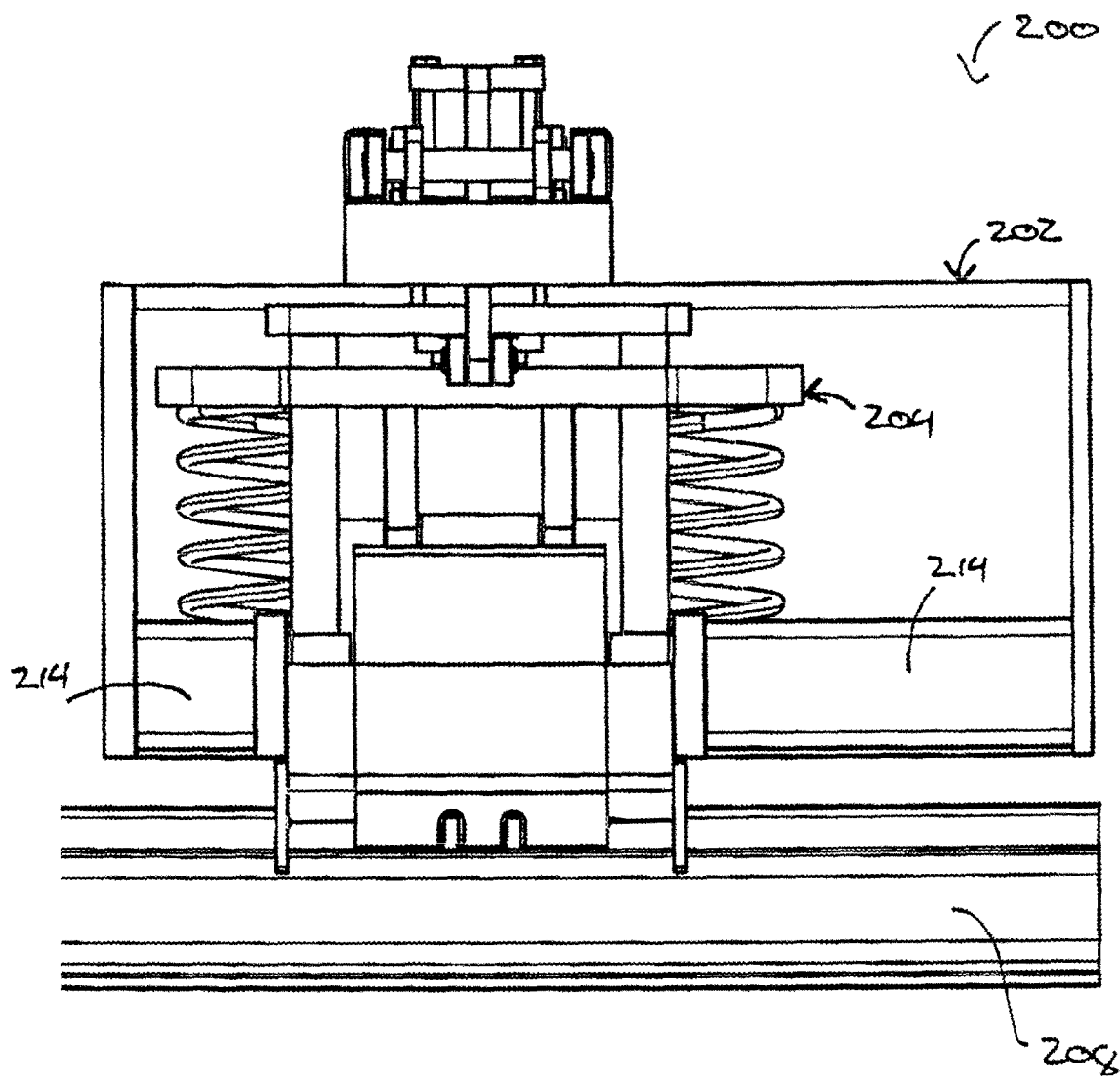
FIG. 16 is a vertical cross-sectional view taken along the longitudinal midline of the rail clamp of FIG. 10 in the fully lowered, brake set position.
Figure 17:
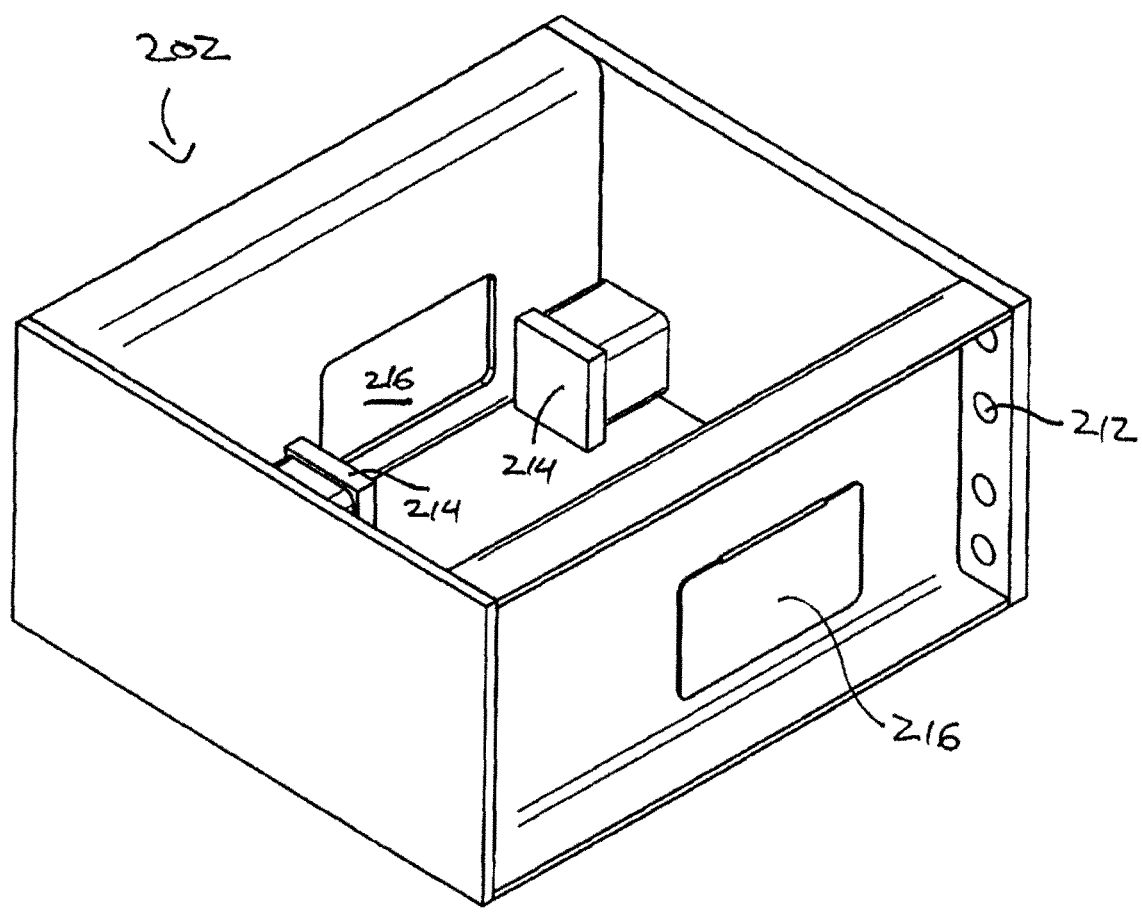
FIG. 17 is an isometric view of the load transfer frame of FIG. 10.

As is best seen in FIGS. 16 and 17 (illustrated in relation to rail clamp 200), the load transfer frame 102 or 202 may additionally comprise one or more longitudinally extending internal load transfer beams or braces 214 to enhance longitudinal location of the deployed clamp mechanism 104, 204 within the load transfer frame 102, 202, respectively. The load transfer frame 102, 202 may also include one or more access ports 216 respectively, to facilitate servicing. In addition, as illustrated in relation to rail clamp 100, the load transfer frame 102, 202 may also, respectively, be configured with or comprise chamfered laterally extending internal beams or braces 118, see FIG. 1, that cooperate with corresponding chamfers or cam rollers 120, of the clamp mechanism, see FIG. 1, so as to laterally center the clamp mechanism 104, 204 within the load transfer frame 102, 202 when it is returned to the raised, brake release position.

Rail Clamp 100

In relation to rail clamp 100 of FIGS. 1-9, clamp mechanism 104 generally comprises a clamp frame 122 that includes two spaced-apart guide posts 124 connecting an upper frame plate 126 with a lower main lever connector plate 128. Each of a pair of lift levers 106 is pivotally mounted on brackets 130 provided at opposing lateral ends of the upper frame plate 126. The lift levers 106 further comprise anti-friction cam rollers 132 at their respective free ends to enable the clamp mechanism 104 to "float" with minimum resistance generally horizontally in a lateral orientation (i.e. substantially perpendicular to the longitudinal orientation of the rail 108) upon one corresponding pair of preferably round pegs 134 provided on the load transfer frame 102.

Each of the opposed facing main levers 110 of clamp mechanism 104 is pivotally mounted to the main lever connector plate 128 by a pivot 136 disposed between a first, upper end 138 and a second, lower end 140 thereof, such that the lower ends of each opposed facing pair of main levers 110 clamp together when their upper ends are moved laterally apart. A brake shoe (not shown) may be provided on the inner face of the lower end 140 of each opposed main lever 110, and a cam roller bearing 142 is provided on the inner face of the upper end 138 of each opposed main lever 110. One or more auxiliary return springs (not shown) is provided, either extending directly between the upper ends 138 of each of the opposed facing main levers 110, or coaxially with the pivot 136 of each main lever 110 in order to bias the upper ends 138 of each of the opposed facing main levers 110 together. The main lever connector plate 128 further comprises, or has rigidly affixed to a lower surface thereof, at least one transverse lateral rail guide 144 (see FIG. 2). The rail guide has a bilateral inwardly angled "double cam" profile dimensioned to produce necessary side loads to cause the clamp mechanism 104 to move laterally within the load transfer frame as may be necessary in order to accommodate for rail misalignments, and to center the clamp mechanism 104 over the rail 108 as the mechanism is lowered vertically onto the rail and into the lowered, brake set position. The rail guide 144 may preferably be constructed of a hardened steel in order to provide a relatively low coefficient of friction vis-à-vis the railhead.

A spring plate 146 is slidable along the guide posts 124 of the clamp frame 122, and is urged in a first, clamping direction by a pair of main power springs 148, each of which is disposed coaxially with a guide post 124 and vertically between the lower main lever connector plate 128 and the spring plate 146. A hydraulically actuated piston 150 is operably connected to the spring plate 146, and may be driven under control of an operator by hydraulic pressure in a second, release direction opposite to the clamping direction (i.e. against the biasing force of the power spring) from a hydraulic cylinder 152 operably connected to the upper frame plate 126. Suitable low-friction bushings (not shown) may preferably be provided within bores 154 of the spring plate 146 to slidingly accommodate the guide posts 124.

Spring plate 146 further comprises, or has rigidly affixed to a lower surface thereof, a power wedge cam assembly 156 that cooperates with and acts upon cam roller bearings 142 of each of the opposed facing pair of main levers 110 as the spring plate 146 moves relative to the clamp frame 122 in either the first, clamping direction or in the second, release direction. At least one pair of slotted lift links 158 are pivotally mounted in brackets 160 at opposing lateral ends of the spring plate 146, each of which links 158 extends generally vertically upwards to slidingly engage a pin 162 provided at a selected distance along the elongate body of each corresponding one of the lateral pair of pivotally mounted lift levers 106 from which the clamp mechanism is suspended within the load transfer frame.

During the first stage of motion of the rail clamp 100, relative motion between the spring plate 146 and the clamp frame 122 is primarily or entirely converted into a generally vertical translation of the clamp mechanism 104 within the load transfer frame 102. As hydraulic pressure within the hydraulic cylinder 152 is reduced to a value below the spring rate of the main power springs 148, the power springs 148 cause the piston 150 to retreat into the cylinder 152 and the spring plate 146 to slide along the guide posts 124 in the clamping direction (i.e. away from the lower main lever connector plate 128 and toward the upper frame plate 126). Since the lift levers 106 are mounted on the upper frame plate 126 and their corresponding lift links 158 are mounted on the spring plate 146, this relative motion between the spring plate 146 and upper frame plate 126 (i.e. the clamp frame 122) causes a corresponding generally vertical upward translational motion of the lift links 158 to occur vis-à-vis the lift levers 106. This relative upwards extension of the lift links 158 in turn allows the lift levers 106 to pivot upwards, and the clamp mechanism 104 to lower towards and onto the rail 108 under the force of gravity. As noted above and further detailed below, if the clamp mechanism 104 is not laterally centered over the rail 108 upon initial contact therewith, the weight of the clamp mechanism 104 acting on the transverse rail guide 144 having a bilateral inwardly angled "double cam" profile causes, in conjunction with the auxiliary double parallelogram linkage 164 described further below (see FIGS. 8 and 9), the clamp mechanism 104 to shift laterally within the load transfer frame 102 as may be required in order to permit a centered seating of the clamp mechanism 104 on the rail 108.

The distance at which the pin 162 is located along the elongate length of each of the pair of lift levers 106 (measured from the pivotally mounted end of the lift lever towards the free end thereof) determines a lever ratio for the lift levers 106. A roughly 3:1 ratio of lift lever movement is preferred, such that the clamp mechanism 104 moves roughly 75 mm vertically for each 25 mm of power spring 148 extension during the first stage of motion of the rail clamp 100.

Once the clamp mechanism 104 has become seated on the rail 108 and no further downward vertical translation of the clamp frame 122 is possible, the main clamp levers 110 are deployed against the side surfaces of the rail 108 during the second stage of motion of the rail clamp 100 until the lowered, brake set position of the rail clamp 100 has been reached. Although further vertical translational motion of the clamp frame 122 is prevented by contact with the rail 108, relative motion (in either the clamping or release direction) between the spring plate 146 and the clamp frame 122 is permitted to continue during this second stage of clamp mechanism motion by virtue of the freedom of the lift lever pins 162 to travel within the elongate slots of the slotted lift links 158.

The relative motion of the spring plate 146 and clamp frame 122 (during both first and second stages of motion) causes the cam roller bearings 142 of the opposed main levers 110 to correspondingly travel along and follow the lateral horizontal profile at each point along the vertical elongate length of the power wedge cam assembly 156. As the lateral profile of the power wedge cam 156 widens, the upper ends of the main levers 110 are correspondingly driven laterally apart. One or more auxiliary return springs (not shown) is provided to bias the upper ends 138 of the opposed facing main levers 110 together in order to maintain contact between the main levers 110 and the power wedge cam 156 when the lateral profile of the power wedge cam narrows.

In the embodiment of FIGS. 1-9, the power wedge cam 156 is symmetrical about its vertical centerline, and includes a first straight portion 166 of constant lateral width, and a second generally frustoconical portion 168 in which the lateral width of the power wedge cam 156 increases at a relatively constant rate. The first straight portion 166 corresponds to the first stage of rail clamp 100 motion, such that no main lever 110 displacement is caused while the rail clamp 100 is being lowered (or raised up) over the rail 108, and the second frustoconical portion 168 corresponds to the second stage of motion, in which vertical translation of the rail clamp 110 has ceased, and in which the main levers 110 are driven into engagement with the side surfaces of the rail 108.

Figure 8:
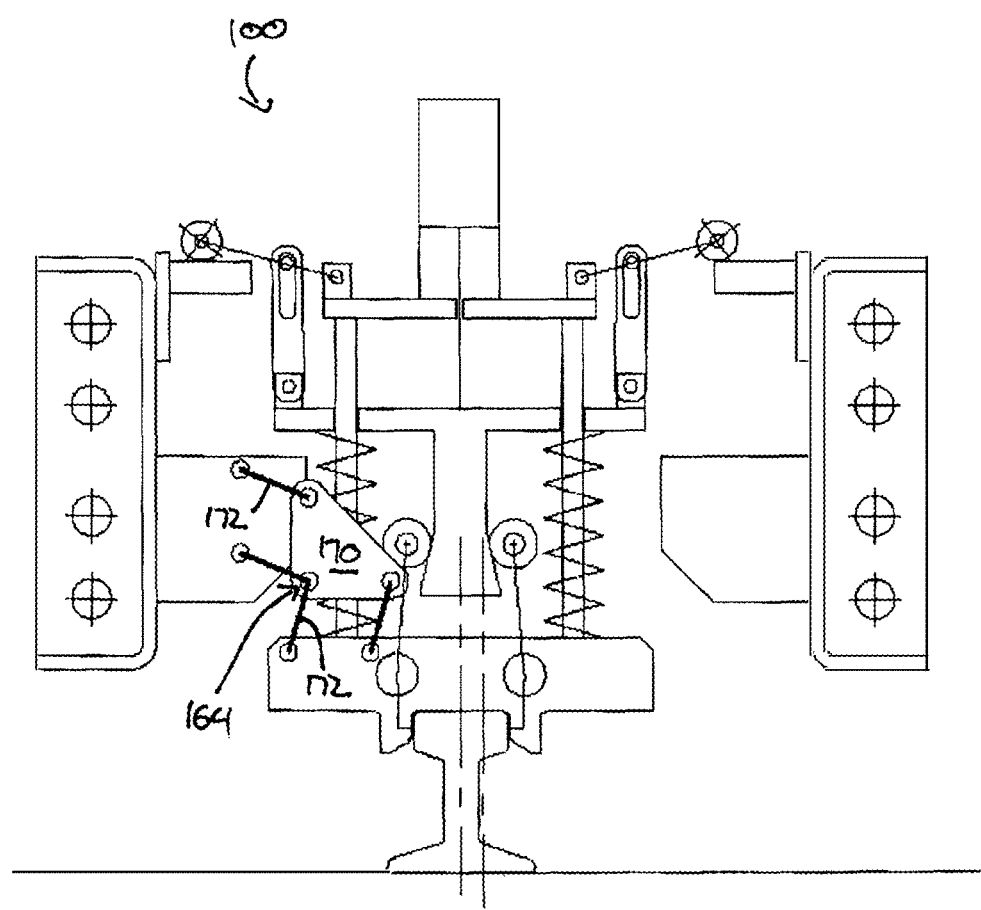
FIG. 8 is a vertical cross-sectional view of the rail clamp of FIG. 1 or 5 taken along a lateral plane through the rail clamp and showing a double parallelogram linkage in accordance with one embodiment of the presently described subject matter.
Figure 9:
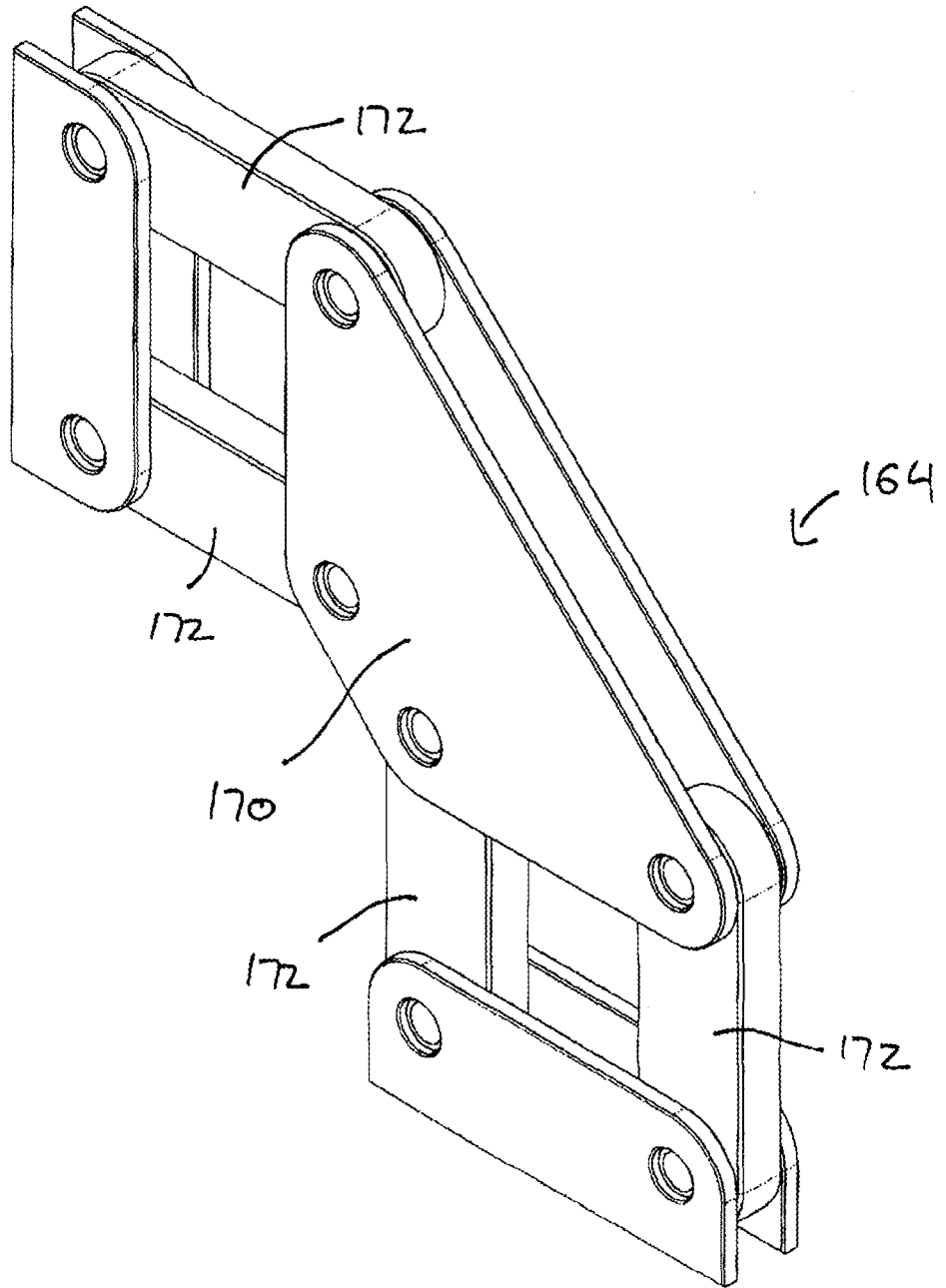
FIG. 9 is a perspective view of the double parallelogram linkage of FIG. 8.
Figure 10:
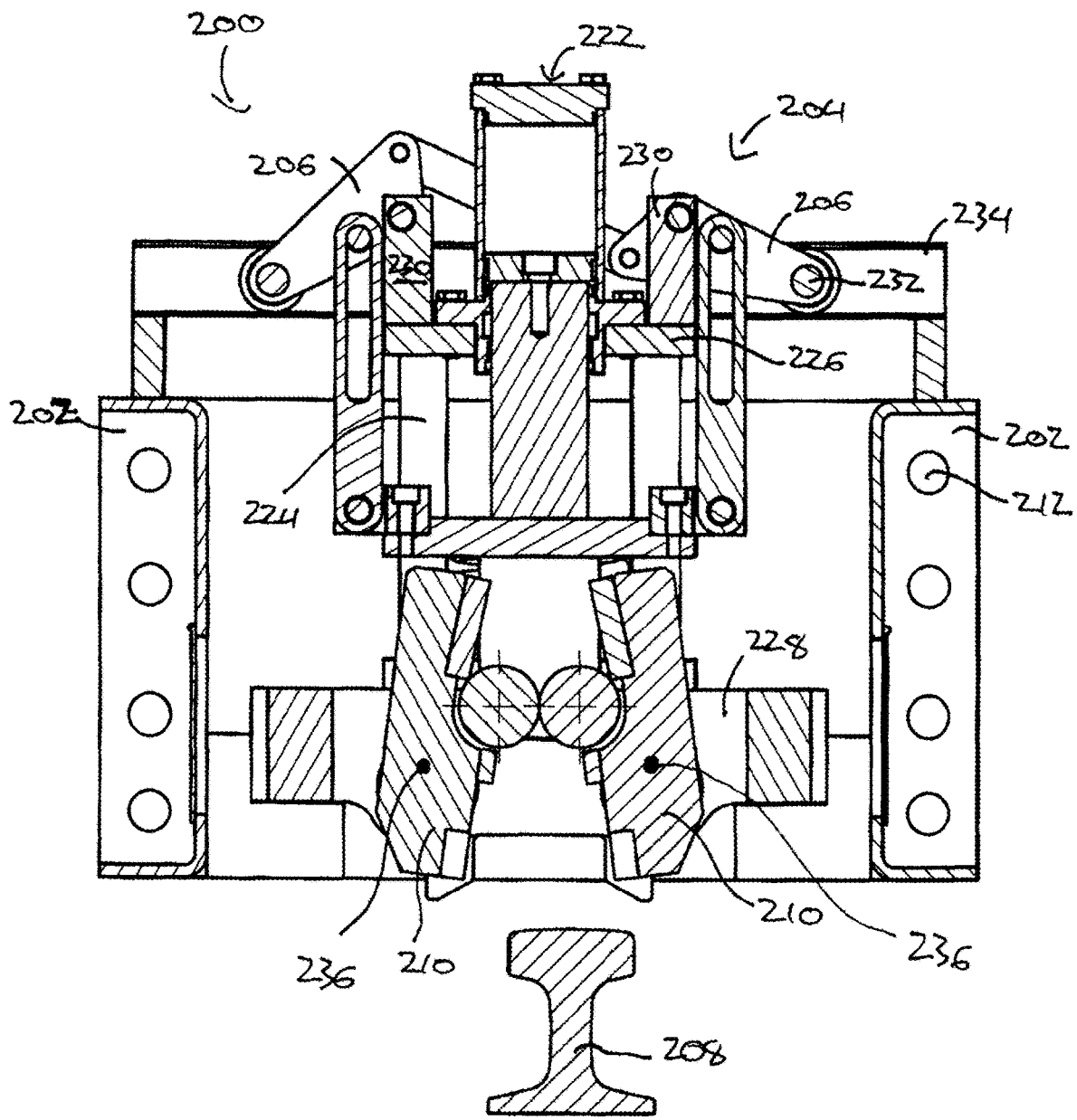
FIG. 10 is a vertical cross-sectional view taken along the lateral midline of a rail clamp according to a second embodiment of the presently described subject matter, showing the rail clamp in the fully raised, brake release position with the clamp mechanism laterally displaced with respect to a rail.
Figure 11:
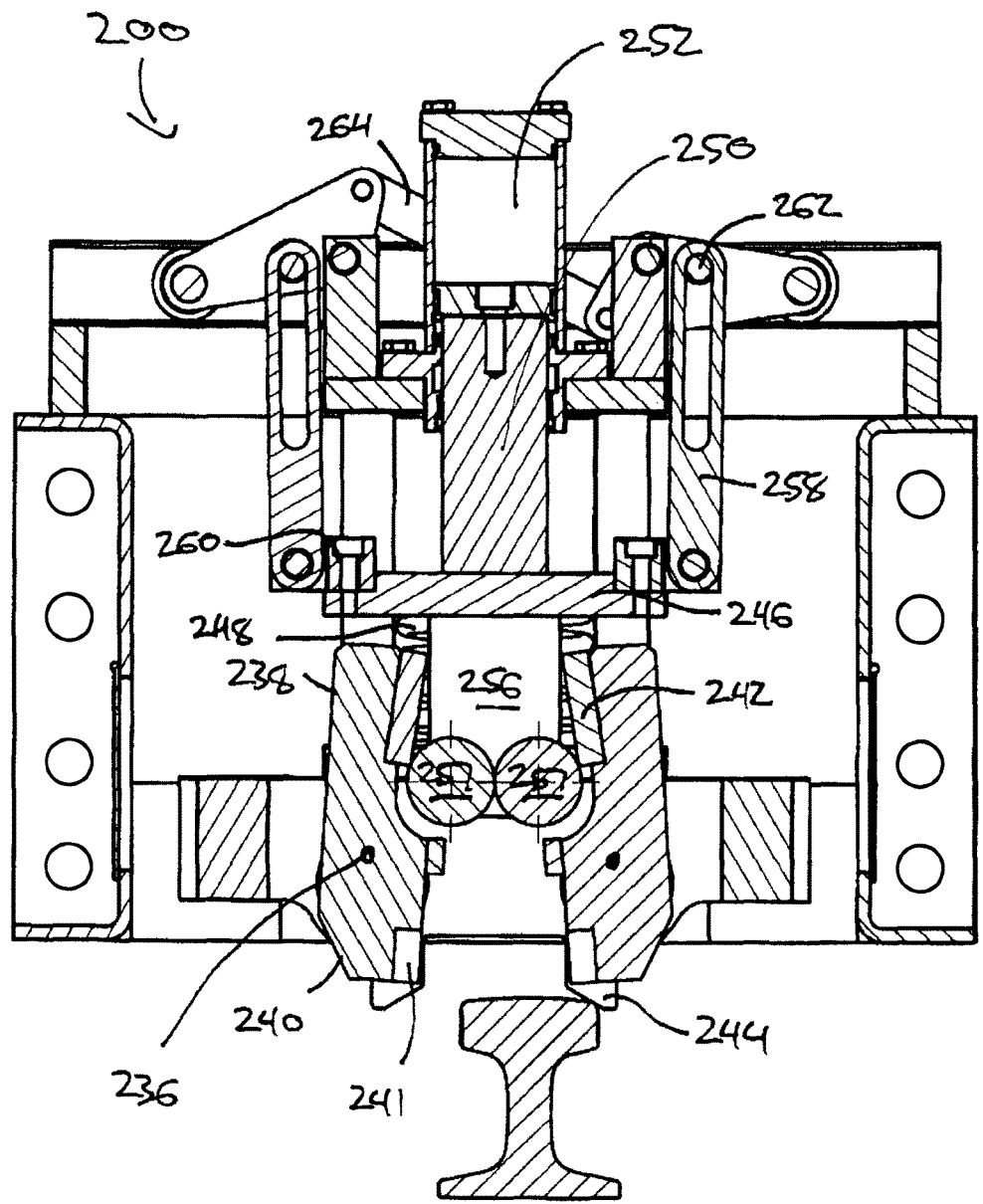
FIG. 11 is a cross-sectional view of the rail clamp of FIG. 10, showing the clamp mechanism in a partially lowered position and in initial contact with the rail.
Figure 12:
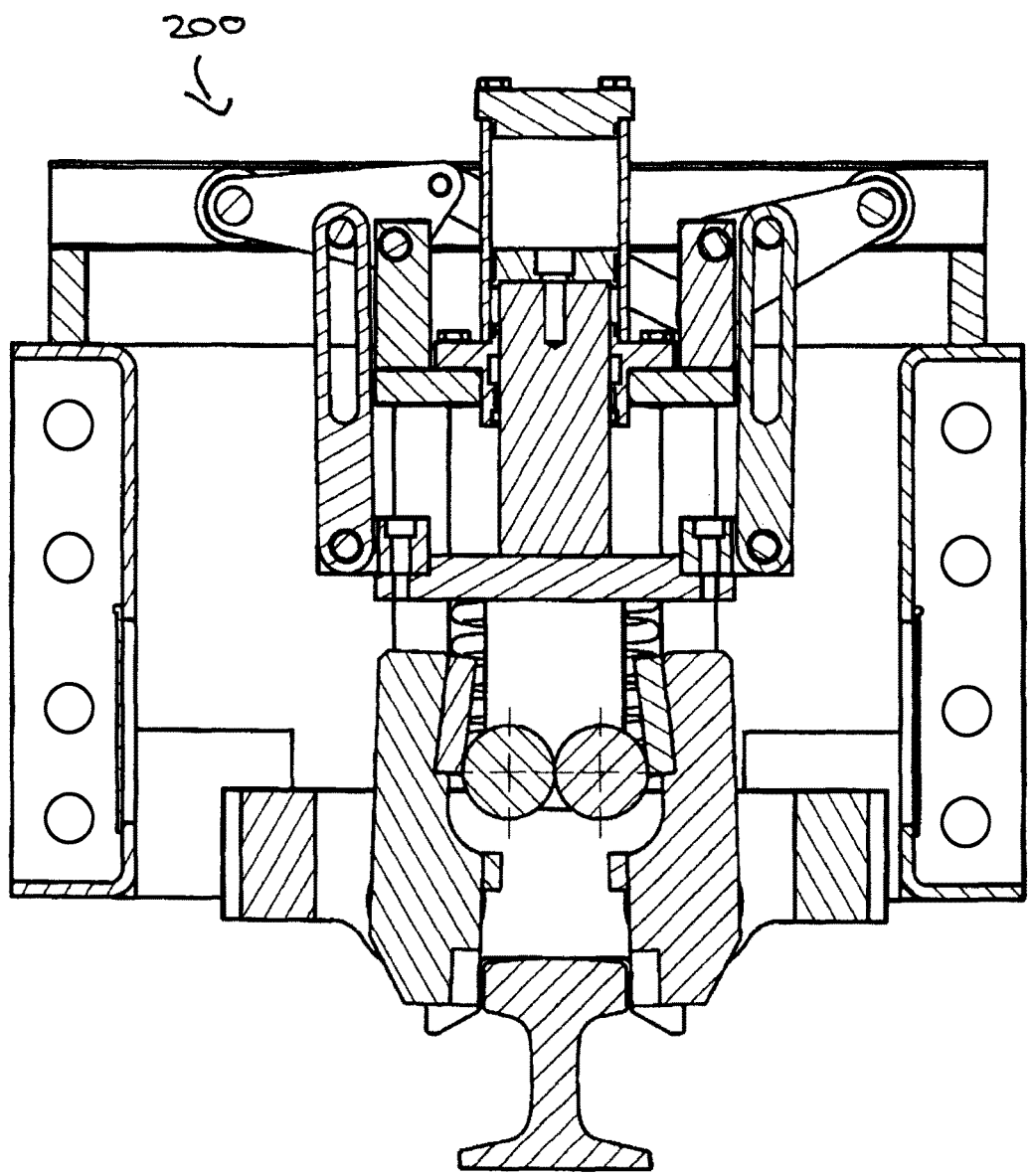
FIG. 12 is a cross-sectional view of the rail clamp of FIG. 10, showing the clamp mechanism in a further lowered position and laterally centered over the rail.

To prevent the clamp mechanism 104 from tipping over laterally when initial contact is made between only one of the bilateral inwardly angled cam surfaces of the rail guide 144 (as may occur when the clamp mechanism is lowered onto a non-centered rail) and the rail 108, the clamp mechanism 104 further comprises at least one auxiliary double parallelogram linkage 164 connecting the clamp mechanism 104 and the load transfer frame 102 (see FIGS. 8 and 9). Double parallelogram linkage 164 generally comprises a central link body 170 and two pairs of pivotally mounted equal-length arms 172. The individual arms of a first pair of arms 172 are pivotally mounted to the link body 170 in spaced apart relationship in a first (e.g. horizontal) orientation, and the arms of the second pair of arms 172 are pivotally mounted to the link body 170 in spaced apart relationship in a second (e.g. vertical) orientation that is perpendicular to the first orientation. The free ends of one pair of equal-length arms 172 are pivotally mounted in spaced apart relationship (at the same distance apart as the arms of the pair are connected to the link body) to the clamp mechanism 104, and the free ends of the other pair of equal-length arms are pivotally mounted in spaced apart relationship (again at the same distance apart as the arms of the pair are connected to the link body) to the load transfer frame 102. Since the double parallelogram linkage 164 effectively constrains motion of the clamp mechanism 104 within the load transfer frame 102 to only substantially vertical and substantially lateral horizontal orientations, the anti-friction cam rollers 132 of the lift levers 106 may be supported by and "float" laterally horizontally simply upon round pegs 134 provided on the load transfer frame 102 without further constraint.

Rail Clamp 200

In relation to rail clamp 200 of FIGS. 10-17, clamp mechanism 204 generally comprises a clamp frame 222 that includes four spaced-apart guide posts 224 (see FIG. 14) connecting an upper frame plate 226 with a lower main lever connector assembly 228. A first pair of guide posts 224*a* connect a first laterally oriented plate 228*a* of the main lever connector assembly 228, and a second pair of guide posts 224*b* connect a second laterally oriented plate 228*b* of assembly 228. Plates 228*a* and 228*b* of connector assembly are further connected by longitudinally oriented plates 228*c* and 228*d* to form a roughly rectangular connector assembly 228 for accommodating paired main levers 210.

Each of a pair of lift levers 206 is pivotally mounted on brackets 230 provided at opposing lateral ends of the upper frame plate 226. The lift levers 206 further comprise anti-friction cam rollers 232 at their respective free ends to enable the clamp mechanism 204 to "float" with minimum resistance generally horizontally in a lateral orientation (i.e. substantially perpendicular to the longitudinal orientation of the rail 208) within a corresponding lateral pair of opposed facing transverse C-channels 234 provided on the load transfer frame 202.

Each of the opposed facing main levers 210 of clamp mechanism 204 is pivotally mounted to the main lever connector plate 228 by a pivot 236 disposed between a first, upper end 238 and a second, lower end 240 thereof, such that the lower ends of each opposed facing pair of main levers 210 clamp together when their upper ends are moved laterally apart. A brake shoe 241 is provided on the inner face of the lower end 240 of each opposed main lever 210, and a cam follower bearing surface 242 is provided on the inner face of the upper end of each opposed main lever. One or more auxiliary return springs (not shown) is provided, either extending directly between the upper ends 238 of each of the opposed facing main levers 210, or coaxially with the pivot 236 of each main lever 210 in order to bias the upper ends 238 of each of the opposed facing main levers 210 together. The main lever connector assembly 228 further comprises, or has rigidly affixed to a lower surface thereof, at least one transverse lateral rail guide 244. The rail guide has a bilateral inwardly angled "double cam" profile dimensioned to produce necessary side loads to cause the clamp mechanism 204 to move laterally within the load transfer frame 202 as may be necessary in order to accommodate for rail misalignments, and to center the clamp mechanism 204 over the rail 208 as the mechanism is lowered vertically onto the rail and into the lowered, brake set position. The rail guide 244 may preferably be constructed of a hardened steel in order to provide a relatively low coefficient of friction vis-à-vis the railhead.

A spring plate 246 is slidable along the guide posts 224 of the clamp frame 122, and is urged in a first, clamping direction by a pair of main power springs 248, each of which is disposed vertically between the lower main lever connector plate 228 and the spring plate 246. A hydraulically actuated piston 250 is operably connected to the spring plate 246, and may be driven under control of an operator by hydraulic pressure in a second, release direction opposite to the clamping direction (i.e. against the biasing force of the power spring) from a hydraulic cylinder 252 operably connected to the upper frame plate 226. Suitable low-friction bushings (not shown) may preferably be provided within bores 254 of the spring plate 246 to slidingly accommodate the guide posts 224.

Spring plate 246 further comprises, or has rigidly affixed to a lower surface thereof, a paired cam roller assembly 256 that cooperates with and acts upon the bearing surface 242 of each of the opposed facing pair of main levers as the spring plate 246 moves relative to the clamp frame 222 in either the first, clamping direction or in the second, release direction. The paired cam rollers 257 of assembly 256 rotate about a pair of longitudinally oriented axes, and are held in horizontal side-by-side relation and in contact with one another (opposite their respective point of contact with the bearing surface 242 of a corresponding main lever 210) by at least one bracket 259 that is integral with or rigidly secured to the lower surface of the spring plate 246. The paired cam rollers 257 accordingly rotate in opposite directions during the relative motion of the spring plate 246 and clamp frame 222, and by virtue of being in contact with one another, equalize or cancel the lateral horizontal compressive forces that may be created by the action of the paired cam rollers 257 against the bearing surfaces 242 of the main levers 210. Each one of the pair of cam rollers 257 rotates against the other, and against the bearing surface 242 of its associated main lever 210 in pure rolling motion. This cancellation of the lateral horizontal compressive forces acting on paired cam rollers 257 means that the axles and bearings of cam rollers 257 are not subjected to high forces, which permits the use of smaller cam roller axles and/or anti-friction roller bearings (as opposed to plain bearings), and in turn results in a low friction and more efficient mechanism.

At least one pair of slotted lift links 258 are pivotally mounted in brackets 260 at opposing lateral ends of the spring plate 246, each of which links 258 extends generally vertically upwards to slidingly engage a pin 262 provided at a selected distance along the elongate body of each corresponding one of the lateral pair of pivotally mounted lift levers 206 from which the clamp mechanism is suspended within the load transfer frame.

During the first stage of motion of the rail clamp 200, relative motion between the spring plate 246 and the clamp frame 222 is primarily or entirely converted into a generally vertical translation of the clamp mechanism 204 within the load transfer frame 202. As hydraulic pressure within the hydraulic cylinder 252 is reduced to a value below the spring rate of the main power springs 248, the power springs 248 cause the piston 250 to retreat into the cylinder 252 and the spring plate 246 to slide along the guide posts 224 in the clamping direction (i.e. away from the lower main lever connector plate 228 and toward the upper frame plate 226). Since the lift levers 206 are mounted on the upper frame plate 226 and their corresponding lift links 258 are mounted on the spring plate 246, this relative motion between the spring plate 246 and upper frame plate 226 (i.e. the clamp frame 222) causes a corresponding generally vertical upward translational motion of the lift links 258 to occur vis-à-vis the lift levers 206. This relative upwards extension of the lift links 258 in turn allows the lift levers 206 to pivot upwards, and the clamp mechanism 204 to lower towards and onto the rail 208 under the force of gravity. As noted above and further detailed below, if the clamp mechanism 204 is not laterally centered over the rail 208 upon initial contact therewith, the weight of the clamp mechanism 204 acting on the transverse rail guide 244 having a bilateral inwardly angled "double cam" profile causes, in conjunction with the intermediate link assembly 264 described further below (see FIGS. 11 and 14) between the paired lift levers 206, the clamp mechanism 204 to shift laterally within the load transfer frame 202 as may be required in order to permit a centered seating of the clamp mechanism 204 on the rail 208.

The distance at which the pin 262 is located along the elongate length of each of the pair of lift levers 206 (measured from the pivotally mounted end of the lift lever towards the free end thereof) determines a lever ratio for the lift levers 206. A roughly 3:1 ratio of lift lever movement is preferred, such that the clamp mechanism 204 moves roughly 75 mm vertically for each 25 mm of power spring 248 extension during the first stage of motion of the rail clamp 200. In general, to achieve suitable clamp mechanism lift and lowering whilst minimizing spring force loss in the power springs, a lift lever ratio of at least 2:1 is desirable.

Once the clamp mechanism 204 has become seated on the rail 208 and no further downward vertical translation of the clamp frame 222 is possible, the lower ends of main clamp levers 210 are deployed against the side surfaces of the rail 208 during the second stage of motion of the rail clamp 200 until the lowered, brake set position of the rail clamp 200 has been reached. Although further vertical translational motion of the clamp frame 222 is prevented by contact with the rail 208, relative motion (in either the clamping or release direction) between the spring plate 246 and the clamp frame 222 is permitted to continue during this second stage of clamp mechanism motion by virtue of the freedom of the lift lever pins 262 to travel within the elongate slots of the slotted lift links 258.

The relative motion of the spring plate 246 and clamp frame 222 (during both first and second stages of motion) causes the paired cam rollers 257 of assembly 256 into corresponding translational motion vis-à-vis the bearing surfaces 242. The bearing surfaces 242 of the opposed upper ends of the main levers 210 (and/or the upper ends of the main levers themselves) are configured so as to angle inwards towards one another, such that the lateral horizontal distance between the bearing surfaces 242 decreases as the distance from the respective pivot axes 236 about which the main levers 210 pivot increases. Accordingly, as the paired cam rollers 257 move vertically upwards relative to the main levers 210 (and as the main levers correspondingly swing laterally outward), the upper ends 238 of the main levers 210 are driven laterally apart, and a lower attack angle "a" is created, which in turn produces a greater mechanical advantage. In addition, the vertical extension of the paired cam rollers 257 away from the pivot axes 236 of the main levers 210 creates a longer lever ratio "Le", again increasing mechanical advantage. One or more auxiliary return springs (not shown) is provided to bias the upper ends 238 of the opposed facing main levers 210 together in order to maintain the bearing surfaces 242 of the main levers 210 in constant contact with the paired cam rollers 257 throughout the operational range of the rail clamp 200.

Figure 13:
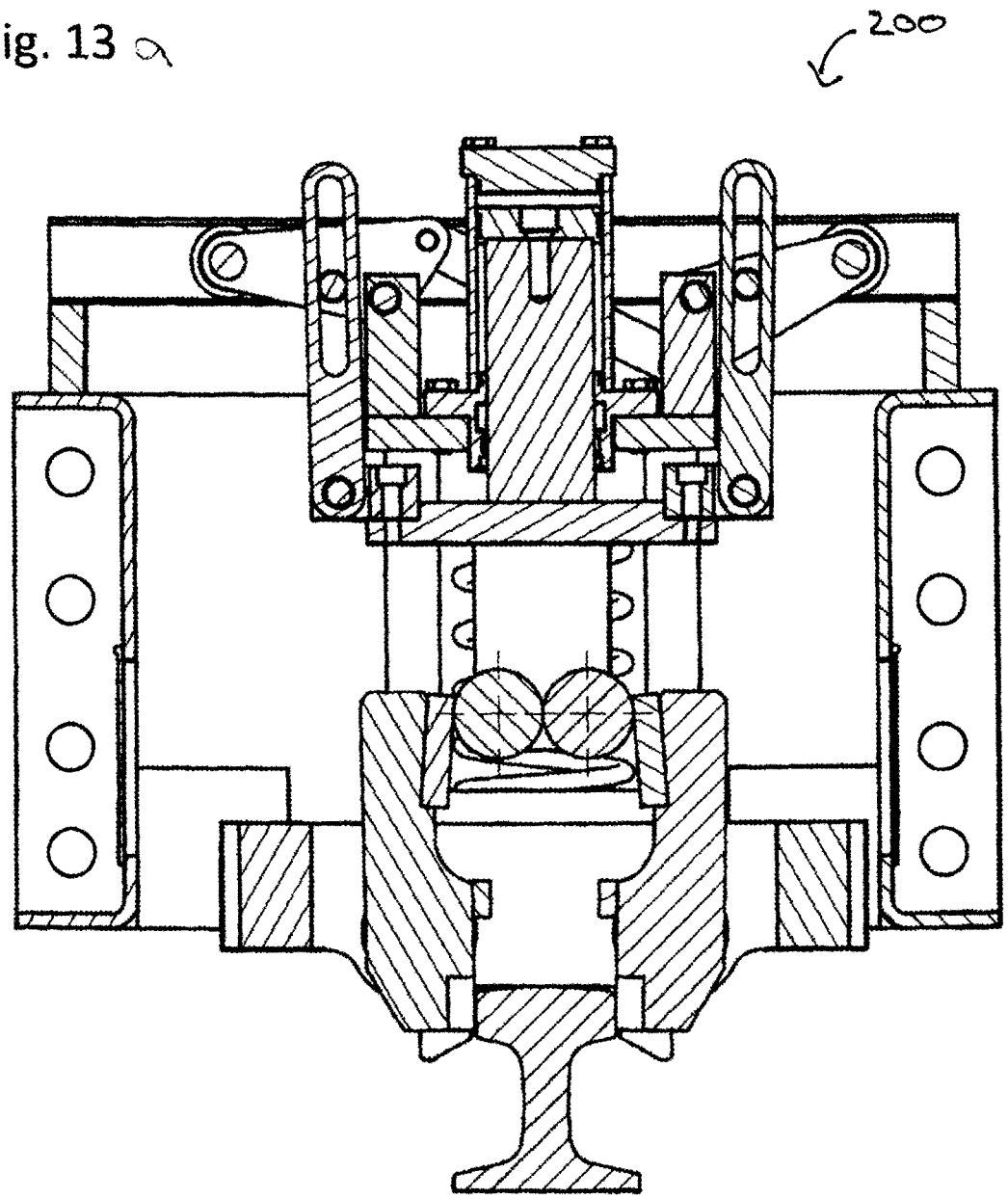
FIG. 13a is a cross-sectional view of the rail clamp of FIG. 10, showing the rail clamp in the fully lowered, brake set position.
FIG. 13b is a diagrammatic view of the rail clamp of FIG. 13a, showing the rail clamp in the fully lowered, brake set position over a standard-width rail.
FIG. 13c is a diagrammatic view of the rail clamp of FIG. 13a, showing the rail clamp in the fully lowered, brake set position over a narrow-width rail.
Figure 13B:
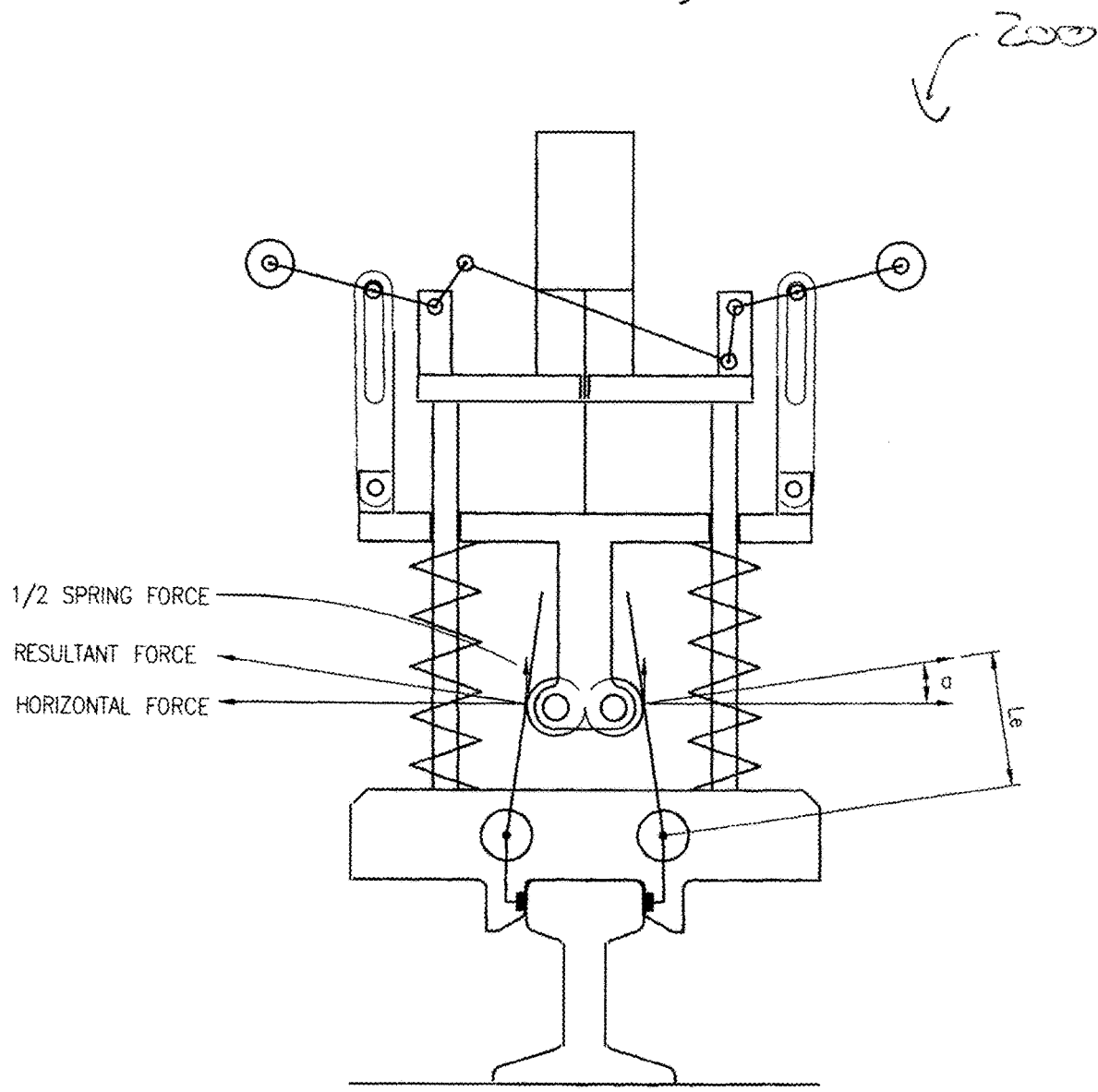
Figure 13C:
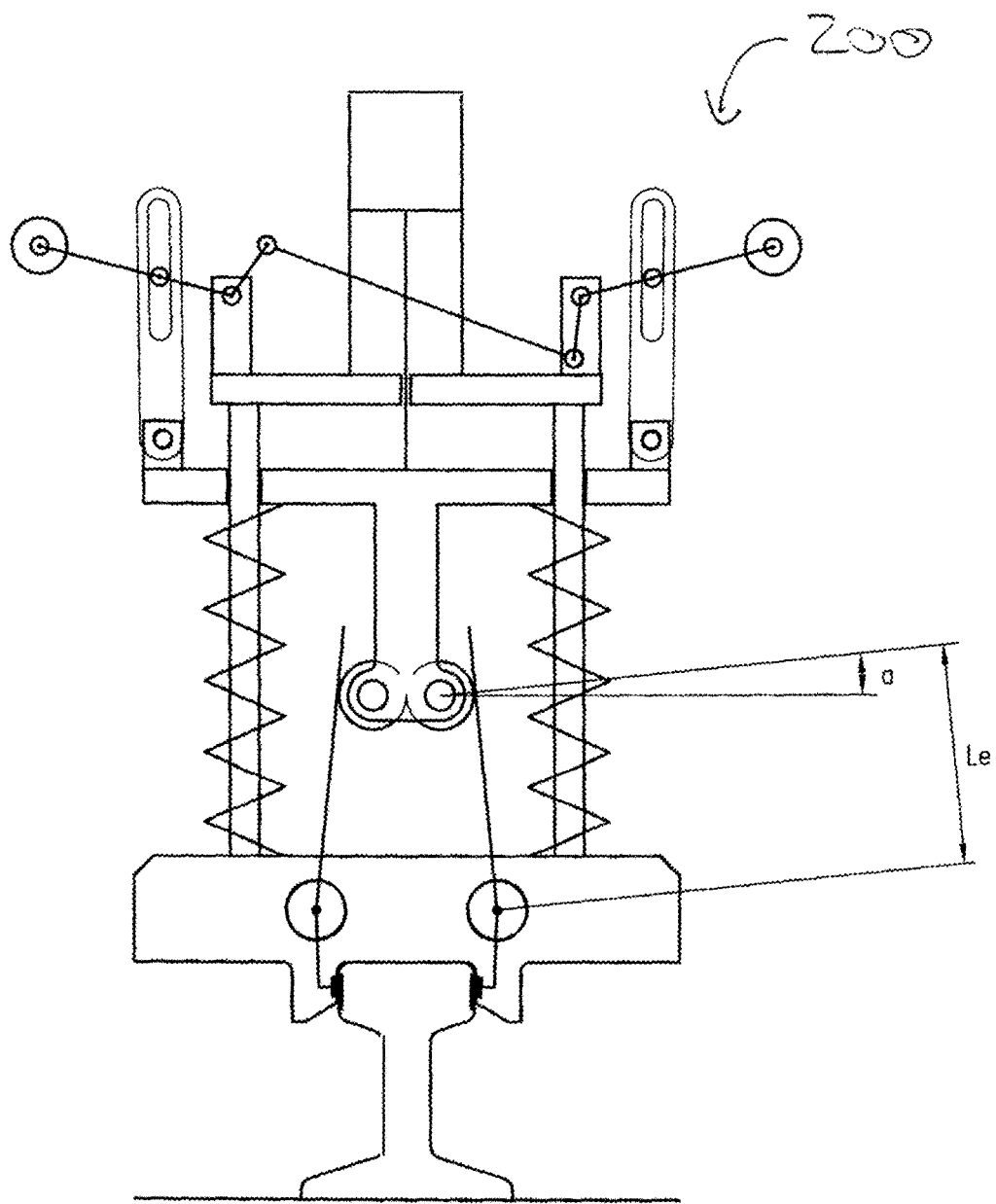
Figure 14:
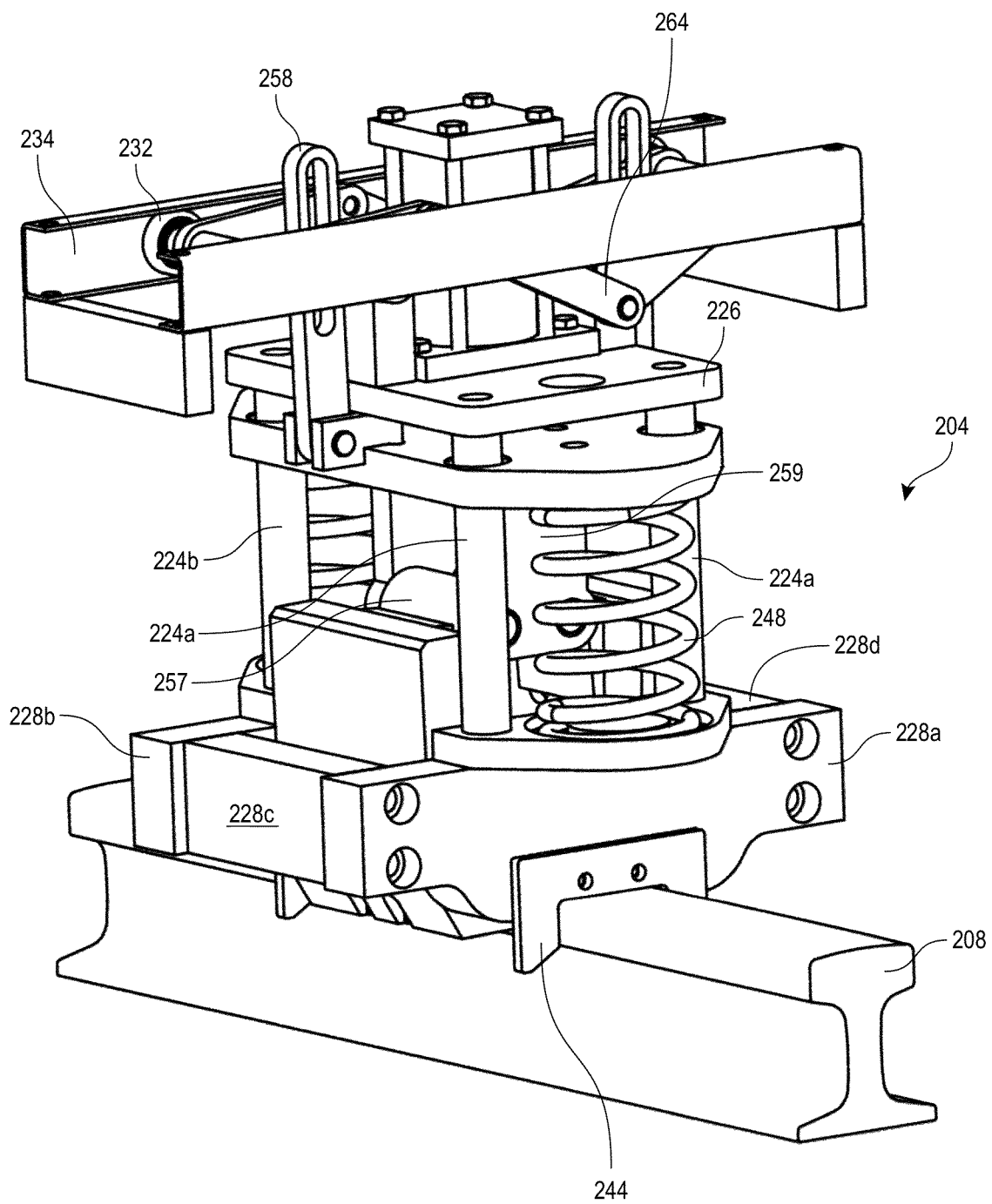
FIG. 14 is an isometric view of the clamp mechanism of FIG. 10 in the fully lowered, brake set position.
Figure 15:
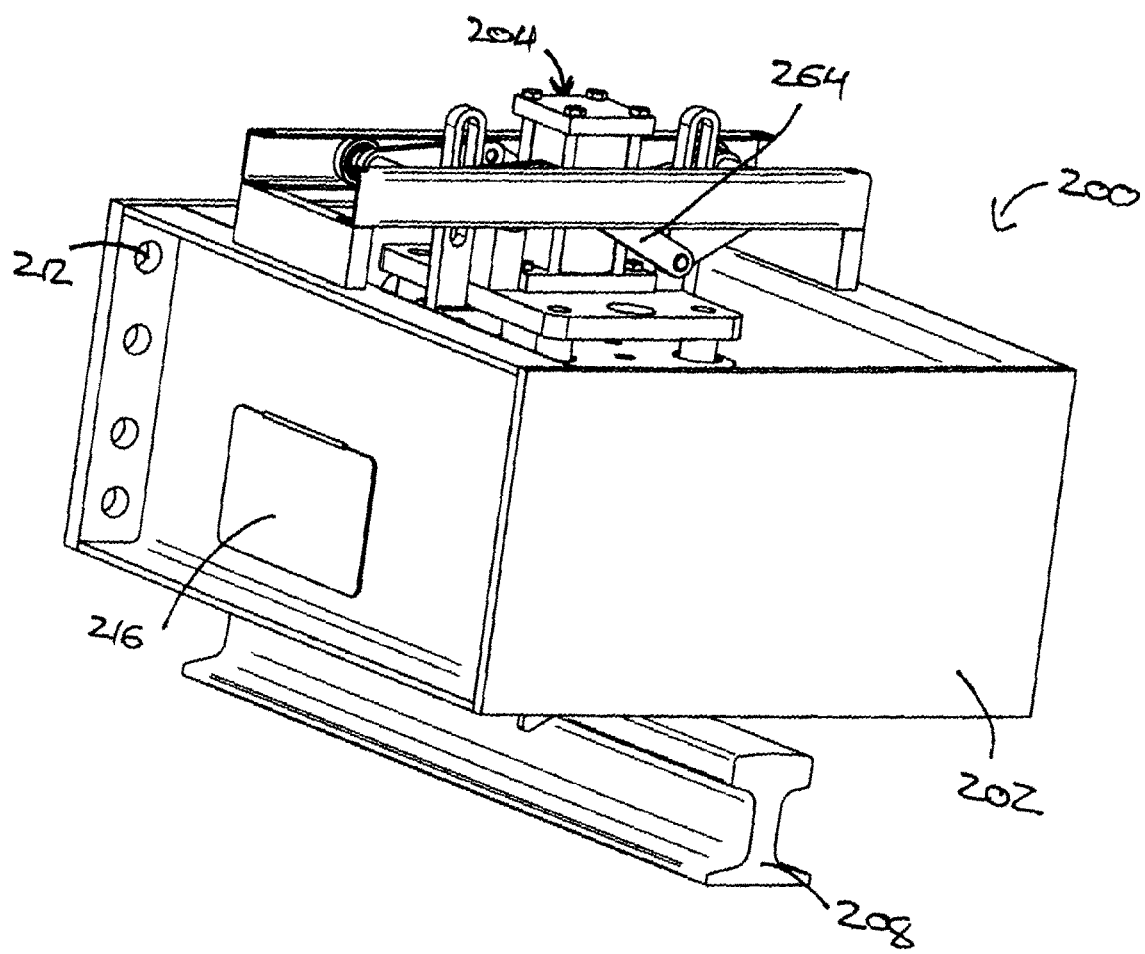
FIG. 15 is an isometric view of the rail clamp of FIG. 10 in the fully lowered, brake set position, and showing the external features of the load transfer frame.

The lower ends 240 of main levers 210 (i.e. the "jaws" of the rail clamp) must be able accommodate varying rail widths, as well as some wear of brake shoes 241, and this requires main levers 210 to rotate to varying positions, depending primarily on rail width. FIG. 13b illustrates the attack angle "a" and lever ratio "Le" of rail clamp 200 in the fully lowered, brake set position over a standard-width rail, and FIG. 13c illustrates the attack angle "a" and lever ratio "Le" of rail clamp 200 in the fully lowered, brake set position over a narrow-width rail.

As any spring (including main power spring 248) extends, it loses force according to its spring rate. Accordingly, in the absence of spring compensation, rail clamp 200 would lose capacity on narrower rails as compared to standard-width rails (or with shoe wear). As noted above, in rail clamp 200, spring force is multiplied by attack angle "a" of the inclined plane that is created by the inwardly angled configuration of bearing surfaces 242 of the opposed upper ends of the main levers 210, and also by lever ratio "Le", which is variable depending on spring extension. As the lower ends 240 of main levers 210 rotate to accommodate narrower rails or worn shoes, the effective cam attack angle "a" is reduced. This results in a lower angle inclined plane relative to the paired cam rollers 257, thereby increasing mechanical advantage with resultant force multiplication. Furthermore, as the paired cam rollers 257 move vertically upwards relative to the main levers 210, so does the roller contact point of the cams. This produces a lengthened lever arm "Le" and a correspondingly increased lever ratio for the main levers 210. The combination of these two characteristics results in an overall increased mechanical advantage for the clamp mechanism 204 as the main power springs 248 extend. By matching the mechanism characteristics, such as initial cam angle and lever length with spring rate, the mechanism can thereby provide substantially effective compensation for spring force loss.

To prevent the clamp mechanism 204 from tipping over laterally when initial contact is made between only one of the bilateral inwardly angled cam surfaces of the rail guide 244 (as may occur when the clamp mechanism is lowered onto a non-centered rail), the clamp mechanism 204 further comprises an intermediate link assembly 264 between the paired lift levers 206. As noted above, the lift levers 206 comprise anti-friction cam rollers 232 at their respective free ends to enable the clamp mechanism 204 to "float" with minimum resistance generally horizontally in a lateral orientation (i.e. substantially perpendicular to the longitudinal orientation of the rail 208) within a corresponding lateral pair of opposed facing transverse C-channels 234 provided on the load transfer frame 202. An intermediate link 264 pivotally connects the paired lift levers 206, and the pivot axis between the intermediate link and one lever of the pair is vertically opposite the corresponding pivot axis between the intermediate link and the second lever of the pair vis-à-vis the main pivot axis of both lift levers on the upper frame plate 226. For example, if the lift lever/intermediate lever pivot axis of a first lever is disposed vertically above the main pivot axis, then the lift lever/intermediate lever pivot axis of a second lever will be vertically below the main pivot axis. The intermediate link linkage thereby synchronizes movement as between the lift levers 206, and in combination with the vertical and longitudinal constraint of the free ends of the paired lift levers by the opposed facing transverse C-channels 234, motion of the clamp mechanism 204 within the load transfer frame 202 is constrained to only substantially vertical and substantially lateral horizontal orientations.

The present description is of the best presently contemplated mode of carrying out the subject matter disclosed herein. The description is made for the purpose of illustrating the general principles of the subject matter and not to be taken in a limiting sense; the described subject matter can find utility in a variety of implementations without departing from the scope of the invention made, as will be apparent to those of skill in the art from an understanding of the principles that underlie the invention.

We claim:

1. A retracting rail clamp for braking or anchoring a rail-mounted machine by clamping opposite sides of a longitudinal rail member, the rail clamp comprising
a load transfer frame rigidly secured to the machine; and
a clamp mechanism comprising a clamp frame including at least two spaced-apart guide posts connecting an upper frame plate or assembly with a lower main lever connector plate or assembly, wherein said clamp mechanism is suspended within said load transfer frame from brackets provided at opposing lateral ends of the upper frame plate by at least one lateral pair of pivotally mounted lift levers, and wherein said clamp mechanism is operable between a raised, brake release position and a lowered, brake set position wherein at least one opposed facing pair of main levers of the clamp mechanism engage the side surfaces of the rail.

2. The rail clamp of claim 1, wherein, said lift levers further comprise anti-friction cam rollers at their free ends to enable the clamp mechanism to float with minimum resistance generally horizontally in a lateral orientation, substantially perpendicular to the longitudinal orientation of the rail, within at least one corresponding lateral pair of opposed facing transverse C-channels or upon at least one pair of pegs provided on the load transfer frame.

3. The rail clamp of claim 1, further comprising a single hydraulic cylinder for operation of the rail clamp between the raised, brake release position and the lowered, brake set position.

4. The rail clamp of claim 1, wherein both the load transfer frame and the clamp mechanism are completely retracted from the rail member when in the raised, brake release position to accommodate wide variation in rail height and rail float.

5. The rail clamp of claim 1, wherein a ratio of lift lever movement, which specifies a movement of the clamp mechanism relative to an extension of power springs, is greater than 2:1.

6. The rail clamp of claim 2, further comprising an intermediate synchronizing linkage between the at least one pair of lift levers and constraining motion of the clamp mechanism to only substantially vertical and substantially lateral horizontal orientations vis-à-vis the load transfer frame.

7. The rail clamp of claim 1, further comprising paired cam rollers in contact with one other.

8. The rail clamp of claim 7, wherein the paired cam rollers contact lever-borne cams arranged such that the inclined plane angles decrease and resultant mechanical advantage increases as the clamp is extended from the raised, brake release position to the lowered, brake set position.

9. The rail clamp of claim 1, further comprising a rail guide having a bilateral inwardly angled double cam profile for centering the clamp mechanism over the rail as the mechanism is lowered vertically onto the rail and into the lowered, brake set position.

10. The rail clamp of claim 1, wherein the load transfer frame comprises chamfered laterally extending internal beams or braces to laterally center the clamp mechanism within the load transfer frame when it is returned to the raised, brake release position.

* * * * *